(12) United States Patent (10) Patent No.: US 8,713,023 B1
Cormack et al. (45) Date of Patent: Apr. 29, 2014

(54) SYSTEMS AND METHODS FOR CLASSIFYING ELECTRONIC INFORMATION USING ADVANCED ACTIVE LEARNING TECHNIQUES

(71) Applicants: Gordon Villy Cormack, Waterloo (CA); Maura Robin Grossman, New York, NY (US)

(72) Inventors: Gordon Villy Cormack, Waterloo (CA); Maura Robin Grossman, New York, NY (US)

( * ) Notice: Subject to any disclaimer, the term of this patent is extended or adjusted under 35 U.S.C. 154(b) by 0 days.

(21) Appl. No.: 13/921,046

(22) Filed: Jun. 18, 2013

Related U.S. Application Data

(63) Continuation of application No. 13/840,029, filed on Mar. 15, 2013.

(51) Int. Cl.
*G06F 17/30* (2006.01)
(52) U.S. Cl.
CPC ...... *G06F 17/30601* (2013.01); *G06F 17/3071* (2013.01); *G06F 17/30648* (2013.01); *G06F 17/30705* (2013.01)
USPC .......................................................... 707/740
(58) Field of Classification Search
CPC .......... G06F 17/30601; G06F 17/3071; G06F 17/30648; G06F 17/30705
USPC .......................................... 707/740, 749, 728
See application file for complete search history.

(56) References Cited

U.S. PATENT DOCUMENTS

| | | | |
|---|---|---|---|
| 4,839,853 A * | 6/1989 | Deerwester et al. ................... | 1/1 |
| 5,675,710 A * | 10/1997 | Lewis .............................. | 706/12 |
| 5,675,819 A * | 10/1997 | Schuetze ......................... | 704/10 |
| 6,189,002 B1 | 2/2001 | Roitblat | |
| 6,463,430 B1 | 10/2002 | Brady et al. | |
| 6,678,679 B1 * | 1/2004 | Bradford ............................... | 1/1 |
| 6,687,696 B2 * | 2/2004 | Hofmann et al. ...................... | 1/1 |
| 6,738,760 B1 * | 5/2004 | Krachman ............................. | 1/1 |
| 6,751,614 B1 * | 6/2004 | Rao ..................................... | 1/1 |
| 6,778,995 B1 | 8/2004 | Gallivan | |
| 6,847,966 B1 * | 1/2005 | Sommer et al. ............... | 707/739 |
| 6,888,548 B1 | 5/2005 | Gallivan | |
| 6,954,750 B2 * | 10/2005 | Bradford ............................... | 1/1 |
| 6,978,274 B1 | 12/2005 | Gallivan et al. | |
| 7,113,943 B2 * | 9/2006 | Bradford et al. .............. | 707/739 |
| 7,197,497 B2 | 3/2007 | Cossock | |
| 7,272,594 B1 * | 9/2007 | Lynch et al. .......................... | 1/1 |
| 7,313,556 B2 | 12/2007 | Gallivan et al. | |
| 7,328,216 B2 * | 2/2008 | Hofmann et al. ...................... | 1/1 |
| 7,376,635 B1 * | 5/2008 | Porcari et al. ......................... | 1/1 |
| 7,440,622 B2 | 10/2008 | Evans | |
| 7,461,063 B1 | 12/2008 | Rios | |

(Continued)

OTHER PUBLICATIONS

WO 2013010262, Kaheer Suleman, "Method and System of classification in a natural langauge user interface", Published on Jan. 24, 2013.*

(Continued)

*Primary Examiner* — Sheree Brown
(74) *Attorney, Agent, or Firm* — Bryan Cave LLP

(57) ABSTRACT

Systems and methods for classifying electronic information or documents into a number of classes and subclasses are provided through an active learning algorithm. Such document classification systems are easily scalable for large document collections, require less manpower and can be employed on a single computer, thus requiring fewer resources. Furthermore, the classification systems and methods described can be used for any pattern recognition or classification effort in a wide variety of fields, including electronic discovery in legal proceedings.

20 Claims, 12 Drawing Sheets

(56) References Cited

U.S. PATENT DOCUMENTS

| | | | |
|---|---|---|---|
| 7,483,892 B1* | 1/2009 | Sommer et al. | 1/1 |
| 7,529,737 B2 | 5/2009 | Aphinyanaphongs et al. | |
| 7,529,765 B2 | 5/2009 | Brants et al. | |
| 7,558,778 B2* | 7/2009 | Carus et al. | 1/1 |
| 7,574,409 B2 | 8/2009 | Patinkin | |
| 7,574,446 B2 | 8/2009 | Collier et al. | |
| 7,580,910 B2 | 8/2009 | Price | |
| 7,610,313 B2 | 10/2009 | Kawai et al. | |
| 7,657,522 B1* | 2/2010 | Puzicha et al. | 707/723 |
| 7,676,463 B2 | 3/2010 | Thompson et al. | |
| 7,747,631 B1 | 6/2010 | Puzicha et al. | |
| 7,809,727 B2 | 10/2010 | Gallivan et al. | |
| 7,844,566 B2 | 11/2010 | Wnek | |
| 7,899,871 B1 | 3/2011 | Kumar et al. | |
| 7,912,698 B2 | 3/2011 | Statnikov et al. | |
| 7,933,859 B1* | 4/2011 | Puzicha et al. | 706/62 |
| 8,005,858 B1* | 8/2011 | Lynch et al. | 707/771 |
| 8,010,534 B2 | 8/2011 | Roitblat et al. | |
| 8,015,124 B2 | 9/2011 | Milo et al. | |
| 8,015,188 B2 | 9/2011 | Gallivan et al. | |
| 8,024,333 B1 | 9/2011 | Puzicha et al. | |
| 8,079,752 B2* | 12/2011 | Rausch et al. | 366/178.2 |
| 8,103,678 B1 | 1/2012 | Puzicha et al. | |
| 8,126,826 B2* | 2/2012 | Pollara et al. | 706/14 |
| 8,165,974 B2 | 4/2012 | Privault et al. | |
| 8,171,393 B2 | 5/2012 | Rangan et al. | |
| 8,185,523 B2 | 5/2012 | Lu et al. | |
| 8,189,930 B2 | 5/2012 | Renders et al. | |
| 8,219,383 B2 | 7/2012 | Statnikov et al. | |
| 8,275,772 B2 | 9/2012 | Aphinyanaphongs et al. | |
| 8,296,309 B2* | 10/2012 | Brassil et al. | 707/758 |
| 8,326,829 B2* | 12/2012 | Gupta | 707/725 |
| 8,346,685 B1 | 1/2013 | Ravid | |
| 8,392,443 B1* | 3/2013 | Allon et al. | 707/765 |
| 8,429,199 B2 | 4/2013 | Wang et al. | |
| 8,527,523 B1* | 9/2013 | Ravid | 707/749 |
| 8,543,520 B2* | 9/2013 | Diao | 706/12 |
| 8,620,842 B1* | 12/2013 | Cormack | 706/12 |
| 2002/0007283 A1* | 1/2002 | Anelli | 705/1 |
| 2003/0120653 A1* | 6/2003 | Brady et al. | 707/7 |
| 2003/0140309 A1 | 7/2003 | Saito et al. | |
| 2004/0064335 A1* | 4/2004 | Yang | 705/1 |
| 2005/0010555 A1 | 1/2005 | Gallivan | |
| 2005/0027664 A1* | 2/2005 | Johnson et al. | 706/12 |
| 2005/0134935 A1* | 6/2005 | Schmidtler et al. | 358/448 |
| 2005/0171948 A1 | 8/2005 | Knight | |
| 2005/0289199 A1 | 12/2005 | Aphinyanaphongs et al. | |
| 2006/0161423 A1 | 7/2006 | Scott et al. | |
| 2006/0212142 A1* | 9/2006 | Madani et al. | 700/49 |
| 2006/0242098 A1 | 10/2006 | Wnek | |
| 2006/0242190 A1* | 10/2006 | Wnek | 707/102 |
| 2006/0294101 A1* | 12/2006 | Wnek | 707/7 |
| 2007/0122347 A1 | 5/2007 | Statnikov et al. | |
| 2007/0156615 A1* | 7/2007 | Davar et al. | 706/15 |
| 2007/0156665 A1 | 7/2007 | Wnek | |
| 2007/0179940 A1 | 8/2007 | Robinson et al. | |
| 2008/0059187 A1* | 3/2008 | Roitblat et al. | 704/257 |
| 2008/0086433 A1* | 4/2008 | Schmidtler et al. | 706/12 |
| 2008/0104060 A1* | 5/2008 | Abhyankar et al. | 707/5 |
| 2008/0141117 A1* | 6/2008 | King et al. | 715/238 |
| 2009/0006382 A1* | 1/2009 | Tunkelang et al. | 707/5 |
| 2009/0077068 A1 | 3/2009 | Aphinyanaphongs et al. | |
| 2009/0077570 A1* | 3/2009 | Oral et al. | 719/318 |
| 2009/0083200 A1* | 3/2009 | Pollara et al. | 706/14 |
| 2009/0119140 A1* | 5/2009 | Kuo et al. | 705/7 |
| 2009/0119343 A1* | 5/2009 | Jiao et al. | 707/200 |
| 2009/0157585 A1 | 6/2009 | Fu et al. | |
| 2009/0164416 A1* | 6/2009 | Guha | 707/2 |
| 2009/0265609 A1 | 10/2009 | Rangan et al. | |
| 2010/0030798 A1 | 2/2010 | Kumar et al. | |
| 2010/0049708 A1 | 2/2010 | Kawai et al. | |
| 2010/0077301 A1* | 3/2010 | Bodnick et al. | 715/274 |
| 2010/0082627 A1 | 4/2010 | Lai et al. | |
| 2010/0106716 A1 | 4/2010 | Matsuda | |
| 2010/0150453 A1 | 6/2010 | Ravid et al. | |
| 2010/0169244 A1 | 7/2010 | Zeljkovic et al. | |
| 2010/0198864 A1 | 8/2010 | Ravid et al. | |
| 2010/0217731 A1 | 8/2010 | Fu et al. | |
| 2010/0250474 A1* | 9/2010 | Richards et al. | 706/12 |
| 2010/0253967 A1* | 10/2010 | Privault et al. | 358/1.15 |
| 2010/0257141 A1 | 10/2010 | Monet et al. | |
| 2010/0287160 A1 | 11/2010 | Pendar | |
| 2010/0293117 A1 | 11/2010 | Xu | |
| 2010/0306206 A1* | 12/2010 | Brassil et al. | 707/754 |
| 2010/0312725 A1 | 12/2010 | Privault et al. | |
| 2011/0029525 A1 | 2/2011 | Knight | |
| 2011/0029526 A1 | 2/2011 | Knight et al. | |
| 2011/0029527 A1 | 2/2011 | Knight et al. | |
| 2011/0029536 A1 | 2/2011 | Knight et al. | |
| 2011/0047156 A1 | 2/2011 | Knight et al. | |
| 2011/0103682 A1 | 5/2011 | Chidlovskii et al. | |
| 2011/0119209 A1* | 5/2011 | Kirshenbaum et al. | 706/12 |
| 2011/0125751 A1 | 5/2011 | Evans | |
| 2011/0251989 A1 | 10/2011 | Kraaij et al. | |
| 2011/0295856 A1 | 12/2011 | Roitblat et al. | |
| 2011/0307437 A1 | 12/2011 | Aliferis et al. | |
| 2011/0320453 A1 | 12/2011 | Gallivan et al. | |
| 2012/0095943 A1 | 4/2012 | Yankov et al. | |
| 2012/0102049 A1 | 4/2012 | Puzicha et al. | |
| 2012/0158728 A1 | 6/2012 | Kumar et al. | |
| 2012/0191708 A1 | 7/2012 | Barsony et al. | |
| 2012/0278266 A1 | 11/2012 | Naslund et al. | |

OTHER PUBLICATIONS

Cormack, G and Lynam, T, "Power and Bias of Subset Pooling Strategies", Published Jul. 23-27, 2007.*

Suleman, WO2013010262.*

Cormack, "Power and Bias of Subset Pooling Strategies", Publication Date: Jul. 23-27, 2007.*

Cormack et al., "Reciprocal Rank Fusion outperforms Condorcet and Individual Rank Learning Methods", SIGIR 2009 Proceedings, pp. 758-759.

Almquist, "Mining for Evidence in Enterprise Corpora", Doctoral Dissertation, University of Iowa, 2011, http://ir.uiowa.edu/etd/917.

Analytics News Jul. 11, 2013, Topiary Discovery LLC blog, Critical Thought in Analytics and eDiscovery [online], [retrieved on Jul. 15, 2013]. Retrieved from the Internet: URL<postmodern-ediscovery.blogspot.com>.

Ball, "Train, Don't Cull, Using Keywords", [online] Aug. 5, 2012, [retrieved on Aug. 30, 2013]. Retrieved from the Internet: URL<ballinyourcourt.wordpress.com/2012/08/05/train-don't-cull-using-keywords/.

Büttcher et al., "Information Retrieval Implementing and Evaluating Search Engines", The MIT Press, Cambridge, MA/London, England, Apr. 1, 2010.

Cormack et al., "Efficient and Effective Spam Filtering and Re-ranking for Large Web Datasets", Apr. 29, 2010.

Cormack et al., "Machine Learning for Information Retrieval: TREC 2009 Web, Relevance Feedback and Legal Tracks", Cheriton School of Computer Science, University of Waterloo.

Grossman et al., "Technology-Assisted Review in E-Discovery Can Be More Effective and More Efficient Than Exhaustive Manual Review", XVII Rich. J.L. & Tech. 11 (2011), http://jolt,richmond.edu/v17i3/article11.pdf.

Lu et al., "Exploiting Multiple Classifier Types with Active Learning", GECCO, 2009, pp. 1905-1908.

Pace et al., "Where the Money Goes: Understanding Litigant Expenditures for Producing Electronic Discovery", RAND Institute for Civil Justice, 2012.

Pickens, "Predictive Ranking: Technology Assisted Review Designed for the Real World", Catalyst Repository Systems, Feb. 1, 2013.

Safedi et al., "Active learning with multiple classifiers for multimedia indexing", Multimed. Tools Appl., 2012, 60, pp. 403-417.

Seggebruch, "Electronic Discovery Utilizing Predictive Coding", Recommind, Inc. [online], [retrieved on Jun. 30, 2013]. Retrieved from the Internet: URL<http://www.toxictortlitigationblog.com/Disco.pdf>.

* cited by examiner

SYSTEMS AND METHODS FOR CLASSIFYING ELECTRONIC INFORMATION USING ADVANCED ACTIVE LEARNING TECHNIQUES

CROSS-REFERENCE TO RELATED APPLICATIONS

The present application is a continuation of and claims priority to U.S. patent application Ser. No. 13/840,029 filed on Mar. 15, 2013, which is incorporated herein by reference in its entirety.

FIELD OF THE INVENTION

The present invention relates generally to information processing and document classification. More particularly, the present invention relates to systems, methods and computer readable media for providing efficient active learning tools that classify and rank each one of a plurality of documents in a collection of electronically stored information.

BACKGROUND

A prominent field in which document classification is widely utilized is electronic discovery, which is commonly referred to as e-discovery. E-discovery is the identification and exchange of information in electronic format (sometimes referred to as electronically stored information or ESI) which must be produced (or may be withheld) in response to, e.g., a request for production or a subpoena in legal proceedings. For example, during a litigation, one party often requests from another party the production of certain documents deemed germane to the claims or defenses at issue in the case. The producing party must then conduct a reasonable search and review to identify those documents that are responsive to the request from a collection of ESI. The producing party may face sanctions for failing to conduct a reasonable inquiry. Thus, it is important that the methodology employed to identify the responsive documents be capable of yielding a sufficiently high percentage of relevant documents in a precise fashion. The percentage of relevant documents that are identified is often referred to as recall, while the percentage of identified documents that are relevant is known as precision. Thus, recall can be viewed as a measure of completeness, while precision can be viewed as a measure of correctness. $F_1$ typically refers to a summary measure that combines recall and precision and that can be used to rate the overall performance of an e-discovery review effort.

One primitive approach for identifying such documents is to do so manually, i.e., through exhaustive human review of each and every document in a collection. Needless to say, the cost, in terms of time and monetary expense, of such manual review becomes impracticable when the number of documents in the collection could easily be in the hundreds of thousands, millions or even more. Moreover, even if each document is reviewed manually, such an effort is error-prone and unlikely to correctly identify the entire subset of relevant documents.

Another commonly employed methodology for e-discovery review is known as keyword-based culling. This approach relies on filtering the documents to be manually reviewed by performing keyword searches. Keyword searching, a technique that is best suited for ad-hoc searches, identifies exactly those documents that contain a number of search terms specified by an individual who is familiar with the matter and the information that might be considered relevant. In some instances, these keywords may be negotiated by the parties to a litigation. However, when used alone, keyword searching can find some but not all, or nearly all, of the potentially relevant documents from the collection. For example, a keyword search may be under-inclusive and miss between 20% and 80% of the relevant documents, thereby exhibiting unacceptably low recall. Also, a keyword search may be over-inclusive and capture much more non-relevant than relevant information, thereby exhibiting low precision. Moreover, although the specified search terms can be highly complex, the results are only as good as the search terms that are relied on, given that the computer is acting merely as a fast filter for finding the pre-defined terms and is not providing added learning value. Furthermore, culling based on keyword searches still relies on human review of the results which, in the case of a modern-day litigation, can be a significant number of documents, not to mention that relevant documents will very likely be overlooked if they do not contain the keyword(s) searched for, or if the subsequent human review fails to identify them.

In light of the foregoing, many technological tools have been developed to reduce reliance on human involvement and improve performance in document classification efforts. These tools employ computerized systems executing software algorithms that attempt to identify and retrieve the set of responsive documents, i.e., the ones that are classified as potentially relevant, by harnessing human judgments on a smaller set of documents, and then extrapolating those judgments to the remaining documents in the collection. Solutions that rely on such processes may be referred to as technology-assisted review tools.

One category of technology-assisted review tools employ rule-based approaches to classify documents from the collection. Typically, certain rules are developed by one or more subject matter experts, and those rules are implemented or followed by a computer to determine whether documents are potentially relevant. A step beyond keyword search, these rules can specify complex linguistic syntax, numerical ranges, and other constructs that serve to distinguish potentially relevant from non-relevant documents. The rules themselves provide an objective measure of why, or why not, a given document is a member or non-member of a given class. However, significant effort can be required in the development of such rules. Moreover, objective rules may fail to capture the subjective intuition of the reviewer, which may in fact be difficult to express in rule form. Therefore, much like keyword-based culling, the results are only as good as the rules that are (or can be) created and relied upon.

While some technology-assisted review methods rely on systematic rules derived from subject matter experts in order to classify the documents in a collection, other methods use algorithms that determine how similar (or dissimilar) each of the remaining documents is in relation to those classified by the reviewer. Accordingly, some e-discovery technologies have incorporated machine learning into the document classification process. Machine learning methods can be grouped into unsupervised learning methods, supervised learning methods and active learning methods. In unsupervised learning, the computerized system, without human intervention, clusters or groups together documents with certain common characteristics. This technique may speed manual review by allowing the same human reviewer to examine only a few documents in the cluster or group of documents purportedly pertaining to the same subject matter. However, the efficiency of human review is limited by the number of similar documents in the collection. For example, a review of a large number of small clusters tends to approximate a pure manual review. Furthermore, incorrect clustering may cause a failure to identify potentially relevant documents. For instance, the clusters themselves may not correspond with requests for production and may contain both relevant and non-relevant documents.

In supervised learning, a training set of documents is selected from the document collection using either random sampling or judgmental sampling (e.g., using keyword-based searching or analysis of a document exemplar from the collection). A training set may also be selected using documents from outside of the collection. For example, synthetic documents (documents created for the purpose of approximating the information content of a likely relevant document) and/or pre-existing documents that contain relevant information (such as a subpoena) may be used. Each document in the training set is then identified by a human reviewer as being a member/non-member of a given class, i.e., each document is coded as relevant or non-relevant. Using the training set, an algorithm attempts to learn the characteristics of the documents in the set, and develops one or more classifiers that differentiate those documents identified by the reviewer as relevant from those identified by the reviewer as non-relevant. The classifiers are then used to classify the remaining documents in the collection as potentially relevant and non-relevant. Because the learning algorithm does not receive feedback during classification, the identification of relevant and non-relevant documents in the remaining portion of the collection, hence the performance of this technology-assisted review method, is significantly limited by the quality of the training set that is initially selected. Additionally, selection of a training set in this manner requires a decision to be made (either by the reviewer or the computerized system) regarding the size and/or composition of the training set, therefore adding operational complexity to the system.

Active learning represents an evolution of supervised learning methods. Similar to the use of training sets in supervised learning techniques, active learning relies on a training set of documents classified by human reviewer(s) to develop a classifier. In contrast to supervised leaning systems, however, active learning systems are able to update the classifier, and hence the training set, using feedback from a machine learning algorithm and further human review of selected documents. For example, an active learning system may provisionally classify selected documents from the collection. The selected documents are then reviewed and classified as relevant or non-relevant by the reviewer, and this additional classification is then used to update the classifier, thereby further improving the effectiveness of the classification system.

Active learning processes typically have several phases. For example, in an initial phase, a subset of documents are selected from the document collection in order to form an initial training set also known as a seed set. Traditionally, the seed set is selected using random sampling, keyword-based searches of the document collection, or ad hoc methods such as using exemplar documents provided by witnesses or found in a prior, related investigation. In a second phase, a reviewer evaluates the documents in the seed set and decides whether each document of the seed set is relevant or non-relevant (i.e., whether the document is a member/non-member of a given class). The decisions are used to generate one or more classifiers. In a third phase, in order to refine the classifiers, additional documents from the document collection that were not a part of the seed set are presented to the reviewer. Again, the user decides whether these documents are relevant or non-relevant by coding the documents using some type of interface. Typically, these tools terminate the training process at some arbitrary point long before the review is complete. Often, this multi-phased approach requires the user to sift through a significant number of documents in order to properly train the classification system. Moreover, much like with the selection of training sets in supervised learning systems, selection of seed sets in this manner requires a decision to be made (either by the reviewer or the computerized system) regarding the size and composition of the set. Like supervised learning systems, the performance of such systems is dependent on the selection of the initial training set, and also requires the reviewer to classify a substantial number of documents in order to seed the system.

Underlying the implementation of machine learning systems are the algorithms used to extract document information profiles, develop classifiers, and classify the documents in a collection according to the classifiers. The process of extracting or creating document information profiles may be referred to as feature engineering, and essentially relies on identifying fragments of elementary information units that may be used to characterize documents. For example, U.S. Pat. No. 7,933,859 discloses the use of Probabilistic Latent Semantic Analysis (PLSA) as a feature engineering method for developing a document information profile. PLSA is used to statistically analyze word contexts and detect concepts within documents. PLSA can become computationally intractable as the number of documents increases given that the algorithm relies on mathematical operations involving document-term matrices. Additionally, as the number of matrix parameters increases, the estimation techniques will more likely fall into local maxima rather than global maxima, which makes optimizing the desired function more difficult. This, in turn, produces sub-optimal results and could lead to different outcomes making the classification system inconsistent. In addition, PLSA and related techniques must be re-calculated whenever the document collection is augmented.

Another example of an algorithm for extracting a document information profile is described in Gordon V. Cormack & Mona Mojdeh, *Machine Learning for Information Retrieval: TREC 2009 Web, Relevance Feedback and Legal Tracks*, in NIST SPECIAL PUBLICATION: SP 500-278, THE EIGHTEENTH TEXT RETRIEVAL CONFERENCE (TREC 2009) PROCEEDINGS (2009) ("Cormack"). Instead of using contextual analysis as in PLSA, Cormack describes deconstructing electronic documents into overlapping byte 4-grams. The 4-grams extracted from a document represent a feature vector which is the document's information profile. According to this feature engineering technique, a document is classified by multiplying the extracted document information profile by a classification vector to develop a score for the document. The classification vector is calculated using a gradient descent update algorithm during the classification system's learning phase(s) (e.g., initial training or active learning).

An example of a commercially available tool that utilizes a machine learning algorithm for e-discovery is Axcelerate from Recommind, Inc. Axcelerate is an example of an end-to-end e-discovery document classification platform that integrates document search, processing, analysis, review and retrieval into one platform. According to Recommind, Inc., Axcelerate uses a predictive coding system that is able to sort the document set by person, timeframe, topic, communication, issue, or concept. Another e-discovery platform, Inview from Kroll Ontrack, Inc., allows users to analyze and review the document collection for responsive documents. The Inview system automates the rest of the review process by learning from the reviewers, prioritizing the documents, and placing the relevant documents into categories. OrcaTec, LLC has developed a Document Decisioning Suite, using OrcaPredict where a senior attorney or a subject matter expert reviews a randomly selected subset of the document collection and determines whether each document sample is responsive. According to OrcaTec, LLC, the system builds a model of the language used in responsive and non-responsive documents. The process repeats until the computer's predictions and the expert's judgments converge. Once convergence is achieved, the model then predicts the remaining documents in the collection. Generally, these e-discovery tools require significant setup and maintenance by their respective vendors, as well as large infrastructure and interconnection across many different computer systems in different locations. Additionally, they have a relatively high learning curve with complex interfaces, and rely on multi-phased approaches to active learning. The operational complexity of these tools inhibits their acceptance in legal matters, as it is difficult to demonstrate that they have been applied correctly, and that the decisions of how to create the seed set and when to halt training have been appropriate. These issues have prompted adversaries and courts to demand onerous levels of validation, including the disclosure of otherwise non-relevant seed documents and the manual review of large control sets and post-hoc document samples. Moreover, despite their complexity, many such tools either fail to achieve acceptable levels of performance (i.e., with respect to precision and recall) or fail to deliver the performance levels that their vendors claim to achieve, particularly when the set of potentially relevant documents to be found constitutes a small fraction of a large collection.

Therefore, there is a need for a more efficient and effective active learning system for document classification that is easily scalable for large document collections, thereby requiring less computational resources (e.g., workstations, servers, and network infrastructure), and less manpower to initiate, maintain and oversee document classification. Moreover, there is a need for such a system to be implemented in a single, portable, disposable, user-friendly, turnkey e-discovery review solution that may be used commercially, whether by legal professionals or departments within organizations, their outside law firms or other vendors.

Furthermore, there is a need for such a classification system to have broad applications beyond e-discovery, so as to be advantageously usable in any electronic information screening, classification or pattern recognition system, especially forward looking situations where new information is frequently generated or added to the document collection.

SUMMARY OF THE INVENTION

Systems, methods and computer readable media are disclosed that provide an efficient active learning platform for document classification that is easily scalable for large document collections. These tools may be used for the purpose of extracting document information profiles, developing classifiers using minimal human input and feedback, and using them to classify each document in a collection of documents as a member or non-member of a pre-defined class and/or subclass. Such tools identify from the document collection the entire subset of documents that would be members of a given class or subclass (e.g., potentially relevant documents), and exclude from the subset those documents from the collection that would not be members of the class or subclass (e.g., non-relevant documents). Moreover, the documents may be ranked according to how well they fit into a class or subclass.

Systems, methods, and computer readable media are capable of classifying documents in a document collection through an active learning algorithm. The active learning algorithm may fork a number of classification paths corresponding to predicted user coding decisions for a selected document. Additionally, the active learning algorithm may determine an order in which the documents of the collection may be processed and scored by the forked classification paths. The use of predicted classifiers and forking allows the classification system to take advantage of the latency inherent in user review of the selected document. Forking allows the classification system to have at least a set of partial calculations ready by the time a user coding decision is received. These partial results allow the classification system to select a next document in an interactive and real-time manner, thereby speeding up the review process.

To classify the documents, a first document may be selected from the document collection and at least two predicted classifiers are calculated for at least one of the one or more classes or subclasses. Each of the predicted classifiers may be calculated using a document information profile for the first selected document, a current classifier, and a different coding decision selected from a set of possible user coding decisions. A processing order for scoring a subset of documents in the collection may be determined. For each of the predicted classifiers, a set of scores may be calculated for documents in the document collection utilizing the processing order and the document information profile of the document to be scored. In response to receiving a user coding decision, data that corresponds with the received user coding decision may be identified (e.g., a set of scores calculated for a predicted classifier). Using the identified data, a set of documents in the document collection may be classified into one or more of the classes or subclasses and a determination may be made as to whether one or more stopping criteria have been met. If one or more stopping criteria have not been met, another document from the collection may be selected in order to continue classifying the documents of the document collection. In addition, a processing time may be allocated for calculating the set of scores corresponding to a predicted classifier.

Systems, methods, and computer readable media are additionally capable of receiving or providing relevance rankings, which may be derived from user input. For example, relevance rankings may be generated by one or more keyword searching algorithms or by a comparison with one or more exemplary documents (e.g., documents from or outside of the collection such as synthetic documents). Additionally, a processing order for the documents to be scored may be derived using the identified data and relevance rankings. A document may be selected by choosing between rankings generated from the identified data, relevance rankings or a combination of the identified data and the relevance rankings. Furthermore, systems, methods, and computer readable media are capable of managing priority queues for ranking the documents of the document collection. Priority queues may be ranked or ordered using identified data and/or relevance rankings.

Systems, methods, and computer readable media are also capable of updating a classifier based on the document information profile generated for a document, a user coding decision associated with the document (e.g., indicating relevance or non-relevance of the document), and a learning rate for limiting the effect of the document on the updated classifier.

Systems, methods, and computer readable media are additionally capable of selecting and presenting documents from the document collection to a user in order to determine whether one or more stopping criteria have been met by measuring system effectiveness using received user coding decisions for the selected documents. System effectiveness may be measured by selecting documents for review in order to estimate precision, recall, false positive rate, false negative rate, true negative rate, or true positive rate. Recall may also be estimated by fitting calculated scores to a standard distribution instead of or in addition to selecting documents for review. The estimate may be validated using a series of user coding decisions. Certain graphs may be generated to indicate tradeoffs between recall and precision. Furthermore, user performance or system performance may be assessed by comparing identified data with user coding decisions.

Additionally, systems, methods and computer readable media are disclosed for implementing such a system as a user-friendly, disposable, integrated, portable, turnkey solution. For example, the classification tool may be implemented on single a device (e.g., a standard PC computer, tablet, laptop, smartphone, or other device). Such a device may run a standard operating system (e.g., Windows, Linux, OSX, Android, iOS) and the classification system is conventionally installed as one or more programs or libraries on the device itself. When the device is, for example, a laptop, tablet, or smartphone, the classification system is easily transportable. Such a device may or may not be further connected to one or more computers or other devices via a network. Alternatively, the classification system may be contained on computer readable media (e.g., a CD, hard disk, USB drive, and/or other bootable media) which, when inserted or coupled to the device, causes the classification system to be run entirely on the device. Such a device may or may not be further connected to one or more computers or other devices via a network.

Additionally, systems, methods and computer readable media are disclosed for merging the multi-phased approach of active learning into a single phase. This single-phase approach allows the user to avoid looking over a stream of non-relevant documents given that, at each iteration of the active learning and classification process, the classification system makes an informed decision as to what document to present to the user at the next iteration. The informed selection process causes the next document to be presented to the user based upon the current state of the classification system using a variety of techniques for selecting the next document. Additionally, merging active learning into a single phase circumvents the need for developing seed sets, as well as related issues such as determining the size or appropriateness of a seed set, therefore reducing complexity while achieving better performance.

For example, the classification process may simply start by presenting a document to a reviewer. A user coding decision may be received for the presented document and a classifier may be calculated based on the received user coding decision, a previous classifier, and a document information profile for the selected document. A set of scores may be calculated for a subset of documents of the document collection using the updated classifier. At any time, relevance rankings for the documents of the document collection may be derived from user input and used to select documents for review. For example, relevance rankings may be generated or provided by one or more keyword searching algorithms or by comparison with a document exemplar (e.g., a document from or outside of the collection). Using the calculated set of scores and any relevance rankings, a subset of the documents of the collection documents may be ranked or ordered. A choice may be made between using the calculated set of scores, one or more relevance rankings or using a combined ranking that fuses one or more calculated sets of scores with one or more relevance rankings to select a further document. A determination may then be made as to whether or not a stopping criterion has been satisfied. If it is determined that a stopping criterion has not been satisfied, a further document may be selected in order to continue the classification process. A number of techniques for selecting a further document may be used at different iterations. Furthermore, move-to-front pooling may be used to prioritize the techniques for selecting a further document.

The number of relevant documents in the document collection may be estimated by fitting calculated scores to a standard distribution and the validity of the estimate may be determined or evaluated using a sequence of user coding decisions. If the validity of the estimate is confirmed, a stopping criterion may be satisfied. It is possible to determine whether a stopping criterion is met by calculating one or more provisional thresholds for classification and comparing classification results with user coding decisions for a control set of documents by comparing the scores calculated for the control set documents with the one or more provisional thresholds.

The above systems, methods and media therefore increase the overall effectiveness of the classification effort by improving both precision and recall, while requiring less computational resources (e.g., workstations, servers, and infrastructure), and less manpower to initiate, maintain and oversee document classification. Additionally, in certain embodiments, a user is able to quickly classify a large number of documents using a minimalist, user-friendly interface that eliminates overhead associated with more complex interfaces and offers a more limited and easily selectable set of options. Moreover, in certain embodiments, the speed of the classification effort is improved through the use of classification vectors rather than matrices, with further improvements realized by reducing the dimensionality of the vector space and/or by using binary values to represent the vector elements.

The classification systems, methods and media described herein are preferably advantageous to e-discovery technology-assisted review tools, as well as a wide variety of additional areas in which pattern recognition and screening are desirable. For example, in law enforcement, security, and for surveillance applications, such a system could be used to uncover new potential threats using already developed classifiers or to apply newly-classified information to discover similar patterns in prior evidence (e.g., detection of fraud or suspicious activity). Additional examples include healthcare screening, diagnosis and treatment prediction, as well as providing alerts to subscribers looking for newly generated content meeting a pre-determined or existing information profile, filtering or performing actions on information fitting a certain profile.

BRIEF DESCRIPTION OF THE DRAWINGS

Further features of the invention, its nature and various advantages will be more apparent from the following detailed description of the embodiments, taken in conjunction with the accompanying drawings in which.

DETAILED DESCRIPTION OF EMBODIMENTS OF THE INVENTION

Systems, methods and computer readable media are provided for classifying and ranking electronically stored information or documents through efficient active learning algorithms. The following description starts with an overview of an exemplary system, platform and software/hardware components, which illustrate an operating environment for the classification platform disclosed herein. From there, the subsequent sections go into further detail in describing the modules, features and interactions of the various components, interfaces and processes. Amongst other things, user interfaces are described for initializing the system and reviewing and coding initial and subsequent documents. Further details are provided regarding the exemplary system components and processes that may be implemented by various types of devices, including components and processes which classify documents, develop document profiles and implement active learning techniques. A variety of additional aspects are also discussed below.

System Overview

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention. Furthermore, although exemplary embodiments are discussed in the context of an e-discovery platform, system, process or media, one of ordinary skill in the art will appreciate that the principles of the invention are applicable to any classification effort in any appropriate field such as law enforcement, spam filtering, regulatory compliance, internet alerts and healthcare.

Figure 1:
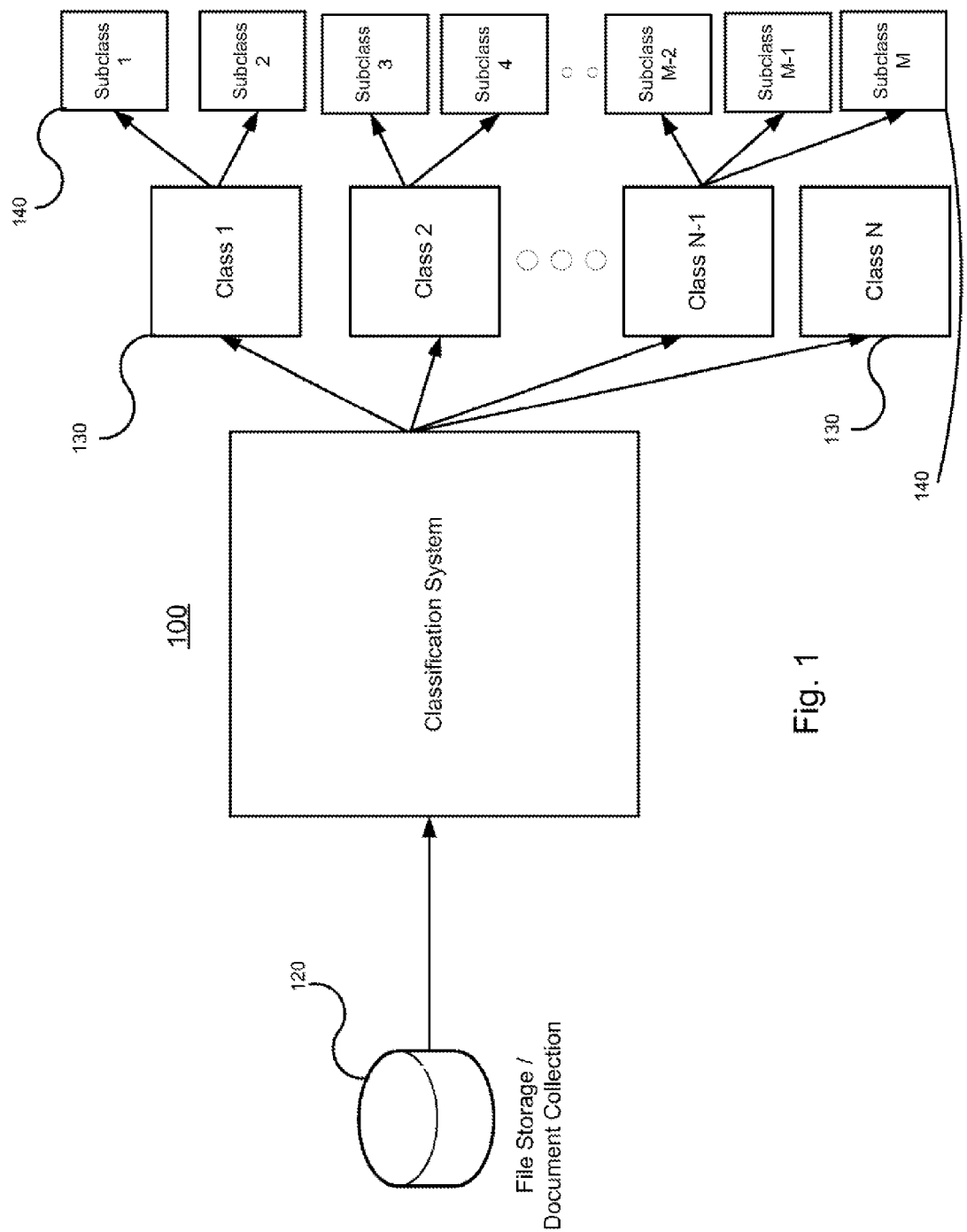
FIG. 1 is a block diagram illustrating a classification system in accordance with certain embodiments.

Referring now to the drawings in which like numerals represent the same or similar elements, FIG. 1 represents a conceptual overview of a classification system 100 or N-classifier system. Classification system 100 solves a classification problem by classifying documents from document collection 120 as members of any number of classes 130 or subclasses 140 as defined in a classification problem. Subclasses 140 may also have additional subclasses, thus creating a multi-level hierarchy of classes and subclasses. A classification problem may require any number of classes 130 and/or subclasses 140 in which to sort or classify a document from document collection 120. A document in document collection 120 may be classified as a member of any number of classes 130 or subclasses 140 defined for a classification problem. A classification problem may define N−1 classes 130 with each class representing a mapping to a concept of a classification problem. For example, in the context of e-discovery, class 1 might represent the set of documents that are related to the issue of liability in a litigation, while class 2 might represent the set of documents potentially relevant to the issue of remedies. A subclass 1 of class 1 might further classify documents as potentially relevant to monetary damages, while subclass 2 of class 1 might further classify documents as potentially relevant to injunctive relief. In this example, classes 1 through (N−1) represent the set of documents that are considered potentially relevant to a classification problem, and class N may represent the set of documents considered non-relevant to the classification problem (e.g., the null set). In its simplest form, a classification problem may be defined to have only two classes: class 1—relevant and class 2—non-relevant. Alternatively, for any particular class X, the set of documents Y that are not a member of class X may be considered as the set of documents non-relevant to class X. A document from document collection 120 may be any information that can be stored in any electronic format including a word-processing file, spreadsheet, email, text message, contact list, calendar entry, HTML file, image file, video file, source code, object code, post-script file or a digital version of a physical document. A document from document collection 120 may be any collection of information that is discretely identifiable or representable.

Figure 2:
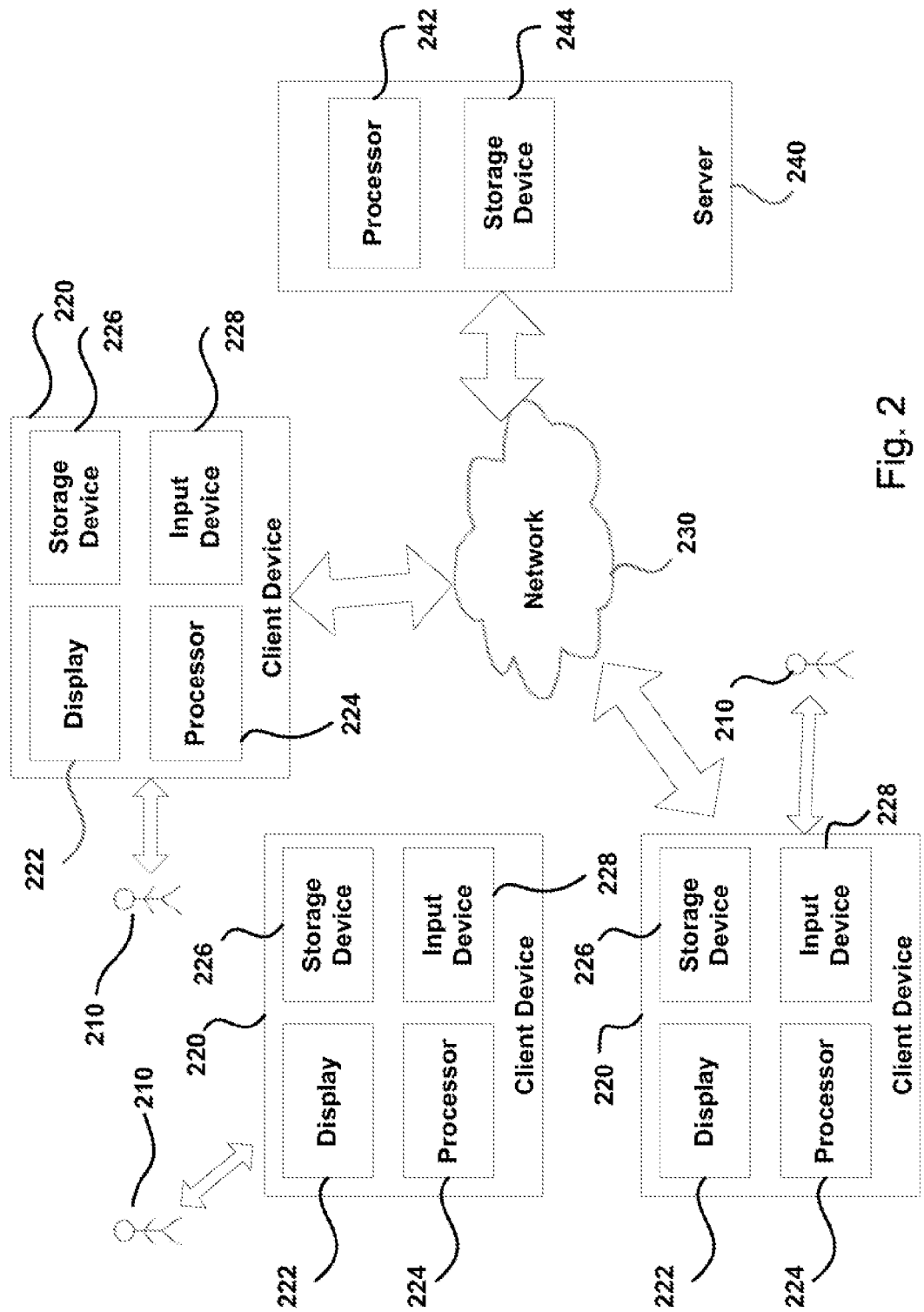
FIG. 2 is a block diagram illustrating a portion of a classification platform according to certain embodiments.

In FIG. 2, a system is disclosed for providing a document classification platform on which the system of 100 of FIG. 1 may be implemented. As shown therein, a plurality of client devices 220 are in communication with one or more servers 240 over a network 230. The network may be any type of network such as one that includes the Internet, a local area network, a wide area network, an intranet, etc. Users 210 may be attorneys, paralegals, case experts, or any other persons that may access classification system 100 for the purpose of conducting, overseeing or performing the desired classification including a document reviewer. Users 210 may utilize client devices 220 to communicate with the server 240. Client devices 220, as well as server 240, may be configured to communicate via wired or wireless links, or a combination of the two.

Client devices 220 may represent a desktop computer, laptop computer, cell or smart phone, tablet device, or other type of computing device. Each of the client devices 220 may be equipped with one or more computer storage devices 226 (e.g., RAM, ROM, PROM, and/or SRAM) and one or more processing devices 224 (e.g., a central processing unit) that are capable of executing computer program instructions. Computer storage device 226 is preferably a physical, non-transitory medium. Any of the client devices 220 may further include a display 222 that is capable of rendering an interface such as the ones described in subsequent sections and one or more input devices 228 (e.g., keyboard, microphone, camera, video camera, scanner, joystick, remote control device, and/or touchscreen). Users 210 may manipulate interfaces rendered on the display 222 using the input devices 228 to communicate with the server 240.

Server 240 may also include one or more processors 242 and one or more computer storage devices 244. Computer storage device 244 is preferably a physical, non-transitory medium. Server 240 may generally represent any type of computing device that is capable of communicating with a client device 220. In some embodiments, server 240 comprises one or more mainframe computing devices that execute a web server for communicating with client devices 220 over the Internet. The storage medium on server 240 can store applications or software code that is configured to provide assistance to users 210 in performing tasks related to the practice of law. Specifically, server 240 may be configured to provide document classification services to users 210 via an interface displayed on client devices 220. Server 240 may be configured to perform the steps in any of processes 400, 600, 700, 800, 900 and 1100 of FIGS. 4, 6-9 and 11 and may further be configured to transmit data for displaying the interfaces 510, 1010, 1011, and 1012 shown in FIGS. 5B and 10. For example, server 240 may cooperate with a client device 220 to present a document from document collection 120 to a user 210, and to display a user interface that permits the user to classify the provided document.

Storage devices 226 or 244 may be internal or external physical media on which document collection 120 of FIG. 1, or a portion thereof may be stored, imported or accessed. Storage devices 226 or 244 may be located on yet another storage medium or facility not shown herein, such as a data storage warehouse, server farm, cloud storage facility, or file hosting service.

One useful feature provided by this system relates to the fact that a number of classification processes may continue to run on server 240 while awaiting a user coding decision (described further below) for the presented document. This useful feature, which permits continued document classification while awaiting a user response, is facilitated by a unique classification forking scheme that prioritizes the processing of documents and improves the manner in which the next document is selected for review, thus allowing real-time interaction between classification system 100 of FIG. 1 and user 210. Another useful function performed by server 240 relates to the server's ability to transmit or push selected documents from document collection 120 directly to users 210 (e.g., through text messages, emails, instant message, or directly to document review push process) for display and review on a user interface.

It should be noted that the system in FIG. 2 is merely meant to demonstrate an exemplary embodiment of an operating environment, and should not be construed as limiting in any manner whatsoever. The particular configuration in FIG. 2 can be altered in numerous ways without departing from the principles herein. For example, it should be noted that the functionality of server 240 in FIG. 2 may be carried out by a plurality of servers 240. Likewise, although the figure depicts a single server 240 connected to three client devices 220, any number of servers 240 and client devices 220 may be utilized with classification system 100, and classification system 100 may be configured in a variety of different ways (e.g., in a distributed computing environment, cloud-based environment, and/or client-server environment).

Furthermore, while FIG. 2 illustrates a plurality of client devices 220 in communication with a server 240 over a network 230, it should be recognized that the functionality provided by server 240 to client devices 220 may be performed locally on each of client devices 220. For example, client devices 220 may utilize an application and/or server that executes locally on client devices 220 to perform the functions of server 240. Thus, any functionality of server 240 which is described herein can alternatively be implemented by a client device 220, and vice versa.

In certain embodiments, client device 220 and server 240 are integrated into a single device (e.g., a standard PC computer, tablet, laptop, smartphone, or other device). For example, such a device may run a standard operating system (e.g., Windows, Linux, OSX, Android, iOS) and classification system 100 is conventionally installed as one or more programs or libraries on the device itself. When device is, for example, a laptop, tablet, smartphone or similar, classification system is easily transportable. Such a device may or may not be further connected to one or more computers or other devices via a network. When configured to operate without a network connection, classification system 100 requires little infrastructure beyond the device itself. Additionally, when configured as a single device without network operability, security is improved because the device may only be accessed physically and not remotely. Moreover, when configured as a single device, security is further increased because data may be stored in a single location (e.g., on the device itself or a device coupled to the device) instead of being shared with a remote location. Because only a single device may be required to implement classification system 100, it is apparent that such an embodiment achieves significant savings in costs, infrastructure and complexity. In addition, such an implementation renders the classification tool more secure, portable, and disposable which represents a secure, user-friendly solution.

In certain embodiments, classification system 100 of FIG. 1 can be configured such that client device 220 is coupled to document collection 120 while server 240 performs the classification processing steps. For example, client device 220 may extract document information profiles and send them to server 240 for further processing and classification. In this embodiment, an enhanced degree of data security is maintained because the entire document collection remains at the same physical location and only non-reconstructable representations of the individual documents are transmitted over a network.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, touchscreens, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Embodiments described herein may be hardware-based, software-based or may comprise a mixture of both hardware and software elements. Thus, while the description herein may describe certain embodiments, features or components as being implemented in software or hardware, it should be recognized that any embodiment, feature or component that is described in the figures or description herein may be implemented in hardware and/or software. In certain embodiments, particular aspects are implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

For example, the entire classification system may be contained on computer readable media (e.g., a CD, hard disk, USB drive, or other bootable media) which, when inserted or coupled to a device (e.g., a standard PC computer, tablet, laptop, smartphone, or other device), invokes the platform (e.g., as "live-media"). Live-media may also contain a suitable operating system (e.g., Linux) and/or may also contain document collection 120 or a portion thereof. When implemented as live-media, the platform may not need to alter the contents of certain memory or storage devices coupled to the device. For example, classification system 100 may not alter the contents of internal disks (HDD, SSD, or flash memory) coupled to the device. In such an embodiment, classification system 100 is easily removable from the device (i.e., disposable) and can be transported from device to device.

Figure 3:
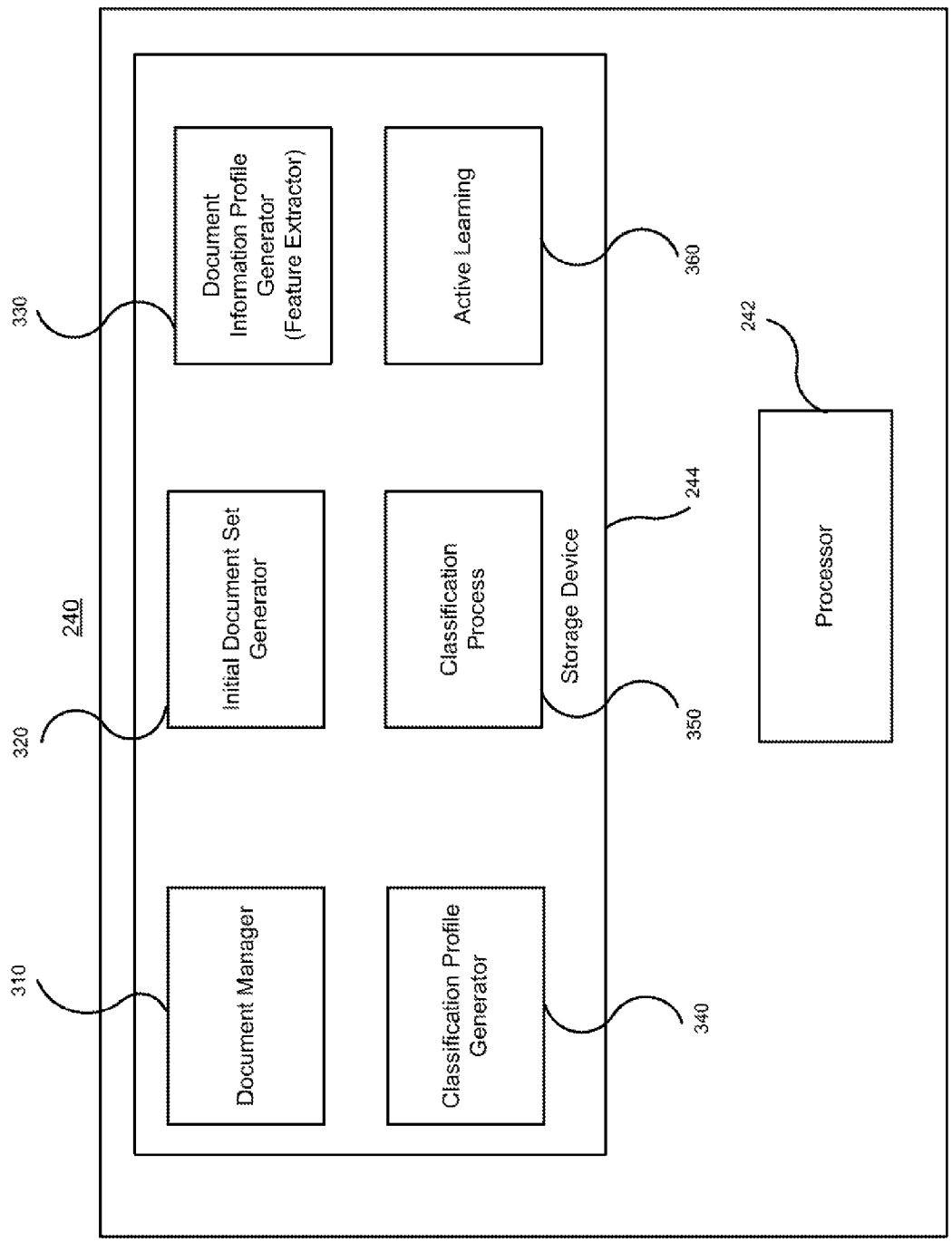
FIG. 3 is a block diagram illustrating components of a server suitable for use in a classification platform according to certain embodiments.

Moving on to FIG. 3, a detailed view of server 240 illustrated in FIG. 2 is illustrated. As shown therein, server 240 may include a plurality of software components (e.g., document manager 310, initial document set generator 320, and/or document information profile generator 330) stored on a memory device 244 (e.g., RAM, ROM, PROM, and/or SRAM). The memory device 244 is in communication with one or more processors 242 that may be configured to execute the instructions associated with the software components.

Figure 10:
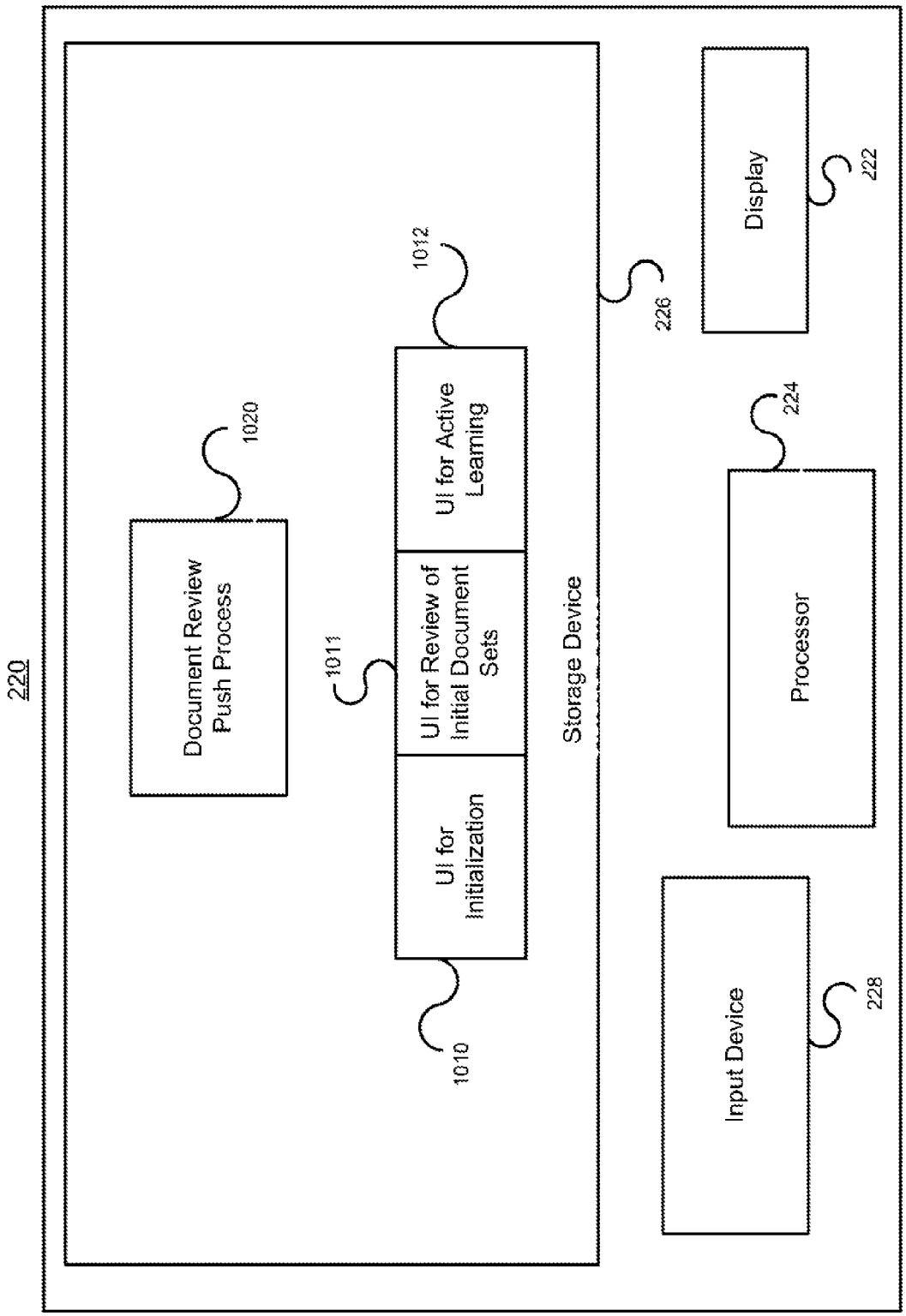
FIG. 10 is a block diagram illustrating components of a client device suitable for use in a classification platform according to certain embodiments.

A detailed view of the client device 220 illustrated in FIG. 2 is disclosed in accordance with certain embodiments of the present invention in FIG. 10. As shown therein, the client device 220 includes a plurality of software components (e.g., user interfaces 1010, 1011, 1012, and document review push process 1020) stored on a memory device 226 (e.g., RAM, ROM, PROM, and/or SRAM). The memory device 226 is in communication with one or more processors 224 that may be configured to execute the instructions associated with the software components. A display 222 is provided for rendering the graphical components of user interfaces 1010, 1011, and 1012. Display 222 allows user 210 to review documents and direct active learning. Input devices 228 are provided for the purpose of allowing user 210 to enter inputs that classify documents and perform other functions of user interfaces 1010, 1011, and 1012.

It should be noted that although the components on memory devices 226 and 244 may be described herein as software modules, such is not necessary. Furthermore, while the components may be illustrated as separate and distinct components, it should be recognized that the components can be combined in any manner (e.g., all of the components may be executed as a part of a single program or as separately executing processes or threads), and that the functions performed by these components may overlap in some instances.

In order to demonstrate the functionality performed by these components, reference will be made to FIGS. 5 and 10, which disclose exemplary interfaces for providing a document classification system to a user 210, as well as FIGS. 4 and 6-9, which demonstrate exemplary methods that may implemented by the components on server 240 and/or client device 220.

Module Overview

To solve a classification problem, classification system 100 relies on a number of software modules (e.g., processing modules and user interface modules), which may be stored in memory devices 226 or 244 of FIG. 2 and configured to be executed on processors 242 or 224 of FIG. 2. Processing modules (e.g., initial document set generator 320, document information profile generator 330, classifier generator 340, classification process 350, and active learning module 360) may communicate with other processing modules on server 240 and may also communicate with user interface modules (e.g., 1010, 1011, and 1012) and document review push process 1020 on client device 220. Processing and user interface modules may be executed in any order and may be executed serially, concurrently or in an interleaved manner and may be executed any number of times in order to solve a classification problem. The person having ordinary skill in the art may only pay attention to having the requisite inputs for a module prepared before executing or invoking the module. For example, in order to run classifier generator 340, a document information profile and user coding decision 555 should exist for the document. An exemplary order of execution according to certain embodiments may be: 1) initialization interface 1010; 2) document information profile generator 330; 3) initial document set generator 320; 4) user interface for review of initial document sets 372; 5) classifier generator 340; 6) classification process 350; 7) active learning module 360. Each of these modules will be discussed in further detail below. In certain embodiments, some modules may not be executed. For example, when eliminating the use of seed sets by merging active learning into a single phase initial document set generator 320 and user interface for review of initial document sets 1012 may be skipped.

System Initialization Interface

Initialization interface 1010 of FIG. 10 allows user 210 to initialize classification system 100. Initialization interface 1010 may allow user 210 to create or specify classes 130 and subclasses 140 for a classification problem. User creation or specification of classes 130 and subclasses 140 may include the ability to annotate or attach a description of each class 130 or subclass 140. For example, user 210 may describe a class 130 or subclass 140 as being related to an issue such as damages or may describe class 130 or subclass 140 as being one or more paragraphs or line items contained in a request for production or a subpoena. In some embodiments, the user 210 need not specify classes 130 or subclasses 140 for a classification problem. For example, the classification problem may be assumed or default to a two class problem. Upon creation or specification of classes 130 or subclasses 140, classification system 100 may initialize or create data constructs associated with the system (e.g., priority queues and/or classifiers).

Initialization interface 1010 also allows user 210 to define document collection 120. For example, initialization interface 1010 may display a file window suitable for selecting files or directories from local or network storage. Files selected by a user 210 may be added to document collection 120. In some embodiments, documents are added to document collection 120 by coupling a device or cable with server 240 or client device 220. For example, after inserting one or more external storage devices (such as a USB, SATA, or Thunderbolt drive), network attached storage (NAS), or similar device into a corresponding port on client device 220 or server 240, the files or documents contained thereon are added to document collection 120.

Initialization interface 1010 may also allow user 210 to indicate settings for active learning module 360. For example, initialization interface 1010 allows user 210 to determine whether or not classification system 100 will use active learning. Initialization interface 1010 may also allow user 210 to specify other users or experts 210 for receiving documents or notifications during active learning and/or review of the initial document sets.

Generation of Initial Document Sets

Initial document set generator 320 shown in FIG. 3 may be configured to analyze the collection of documents in the document collection 120 and select a subset of documents (e.g., a seed or training set, which may be referred to herein as the "initial document set"). The initial document set selected by the initial document set generator 320 may then be reviewed by a user in some cases. As the documents are reviewed, the user may make user coding decisions (e.g., which indicate whether the document is relevant or non-relevant) and the user coding decisions that apply to each document may be associated with applicable classes or subclasses and/or recorded by the system. The user coding decisions may then be utilized to generate document information profiles and/or classifiers.

Figure 4:
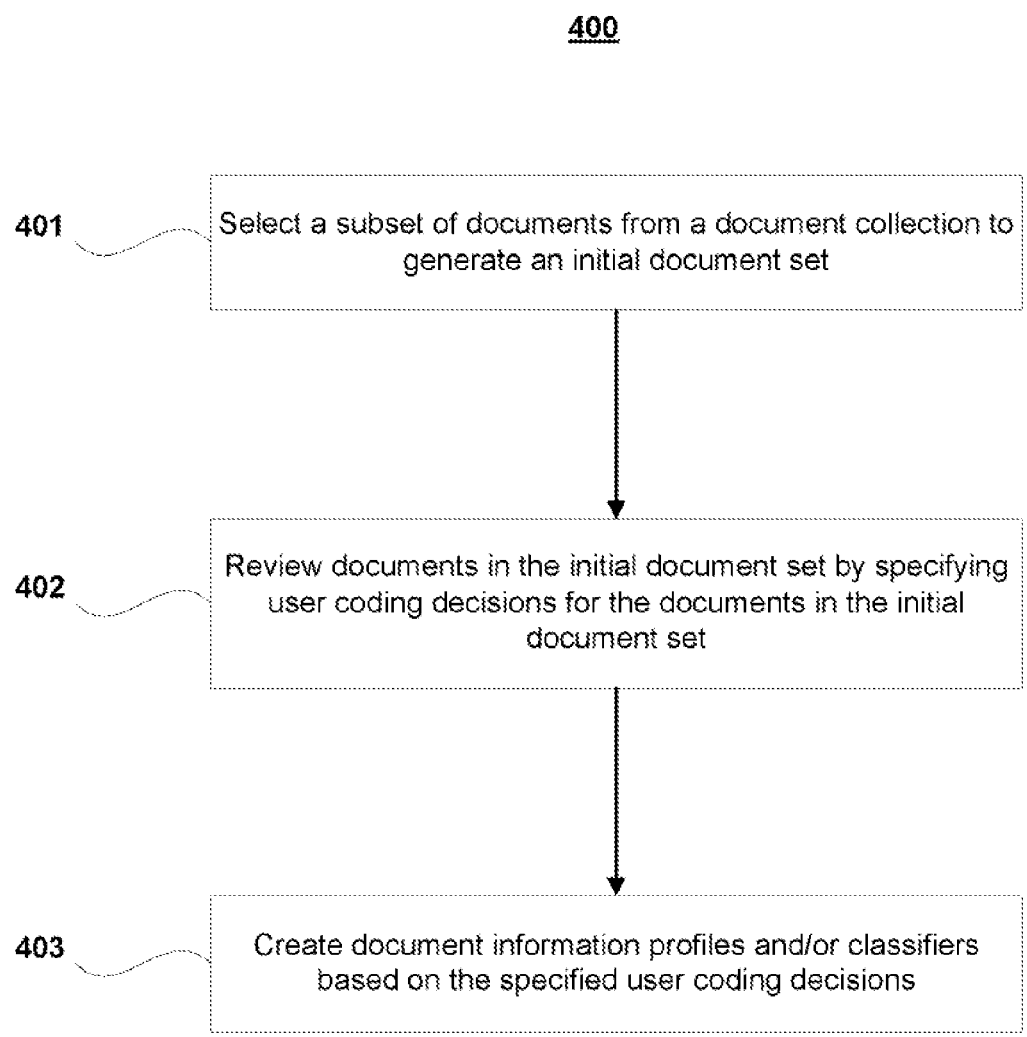
FIG. 4 is a flow diagram illustrating a process for initially training a classification system according to certain embodiments.

FIG. 4 illustrates an exemplary method 400 for generating and processing an initial document set in accordance with certain embodiments. Initially, a subset of documents may be selected from a document collection 120 in order to generate an initial document set at step 410. In certain embodiments, the initial document set generator 320 may be configured to generate the initial document set.

The selection of the initial document set may be performed in any number of ways. For example, in some cases, a subset of documents from the document collection 120 may be randomly selected to create the initial document set. Alternatively, a user 210 may enter keywords, rules or regular expressions which may be utilized to search document collection 120 so as to identify documents from the collection meeting the specified criteria. All or some of the identified documents may be added to an initial document set.

In certain embodiments, the initial document set generator 320 may execute a keyword search operation on the document collection 120 using the Wumpus Search Engine (developed at the University of Waterloo) running the BM25 (OKAPI) algorithm or other type of search engine. For example, the document collection 120 may be provided to the search engine for analysis (e.g., the documents may be uploaded or otherwise made available), and a user 210 may be permitted to search the document collection providing keyword queries to the search engine. The search engine may return a subset of documents according to the specified search algorithm which satisfy the query provided by the user. Each of the documents in the subset (or a portion thereof) may be ranked based on how closely the document matches the user's query. The subset of documents (or portion thereof) returned in response to the user's query may be added to initial document set. For example, only those documents above a certain rank may be added to the initial document set. Naturally, the form of user query (and the results) may be dependent on the classification problem to be solved.

In further embodiments, a meta-searching algorithm is employed to identify and return documents from document collection 120. For example, the document collection 120 may be searched by a plurality of searching algorithms in response to a user 210 providing hints or queries. The results returned from each searching algorithm may be further processed in a rank fusion step which serves to generate a rank for each document returned by the individual search algorithms. In some embodiments, the rank fusion step includes reciprocal rank fusion. The ranks assigned to each document may be utilized to determine how closely the document satisfies the user's hint or query. Some or all of the documents returned by the meta-searching algorithm may be added to an initial document set. For example, only those documents above a certain rank may be added to the initial document set. In certain embodiments, meta-searching may be implemented using supervised learning algorithms like logistic regression through a technique known as stacking. In stacking, the scores or ranks yielded by one or more classifiers or ranking methods for that document are used to represent the features (document information profile) of the document. Stacking is generally superior to (although more complex than) reciprocal rank fusion, in that it tends to give the potentially relevant documents higher ranks, and non-relevant documents lower ranks.

Alternatively, the initial document set generator 320 may use a combination of methods to select an initial document set. For example, the initial document set generator 320 may allow a user 210 to generate an initial document set by using one or more hint searches to retrieve a set or sets of one or more documents from document collection 120. User 210 may also choose to augment this initial document set by adding one or more randomly selected documents from document collection 120. Initial document set may be augmented, or reduced in size, any number of times. In certain embodiments, an initial document set is generated for each class 130 or subclass 140 associated with the classification problem.

Figure 5A:
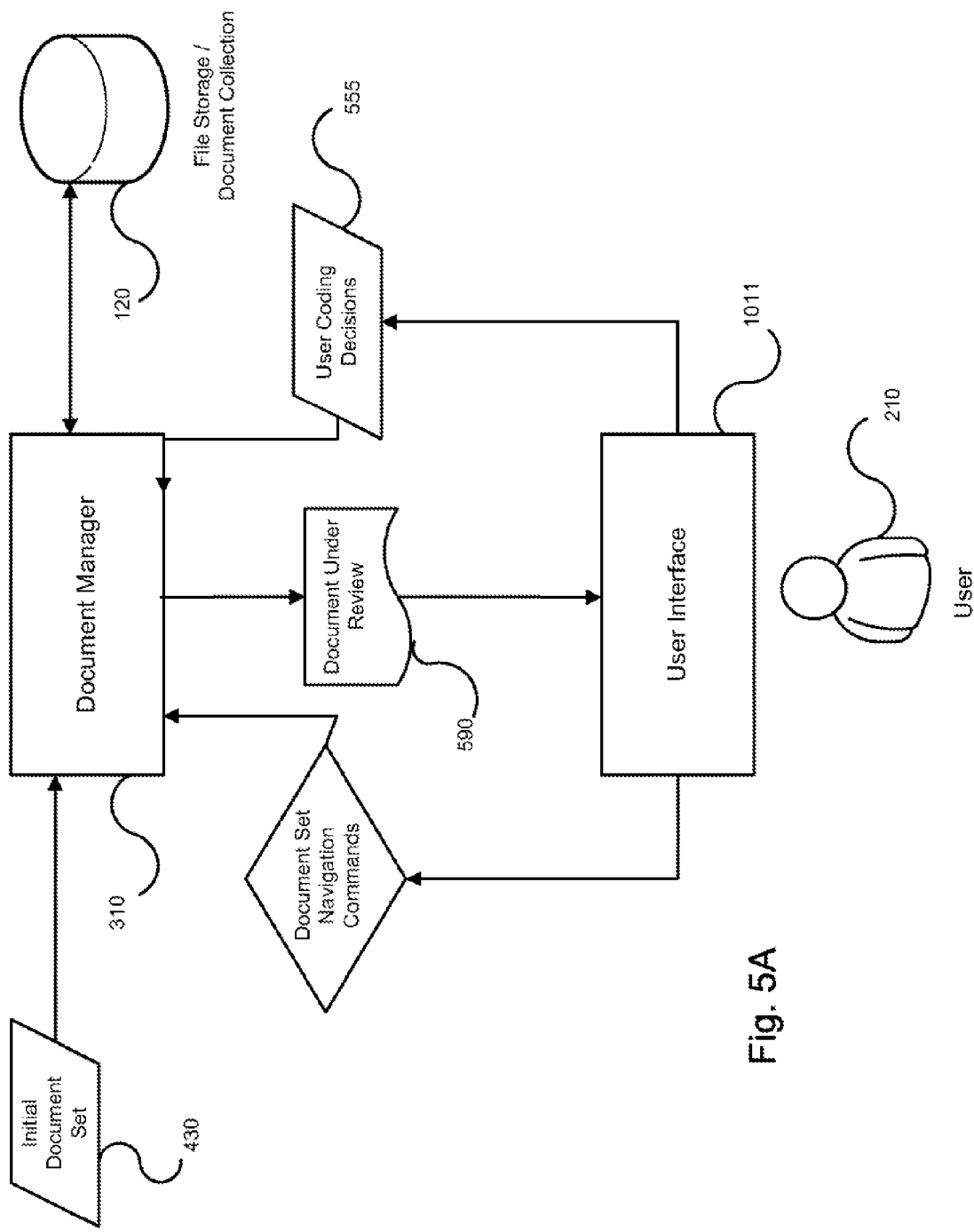
FIG. 5A is a flow diagram for processing commands and capturing user input from an interface according to certain embodiments.
Figure 9:
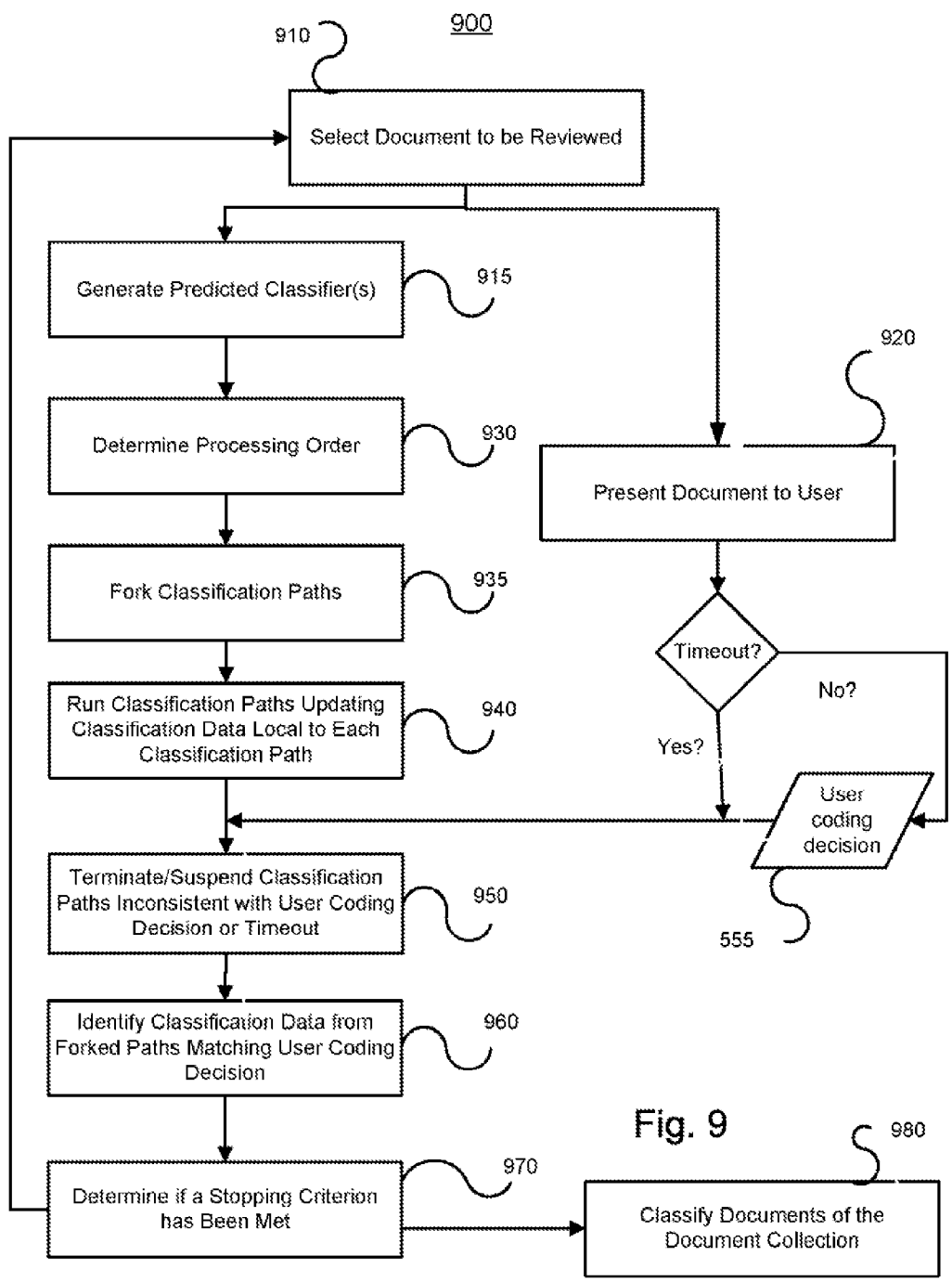
FIG. 9 is a flow diagram illustrating a process for active learning according to certain embodiments.

After an initial document set has been generated from the document collection, a user 210 (which may be an expert on the classification problem) may review initial document set at step 402. The user may additionally specify user coding decisions 555 (which are illustrated in FIGS. 5A and 9 described in the discussion that corresponds to the figures) for each document that is reviewed. For example, the user may determine and/or select a class 130 and/or subclass 140 to be associated with each document in the initial document set. As mentioned above, a classification problem may define any number of classes 130 and subclasses 140. The documents from document collection 120 may be a member or a non-member of any number of classes 130 and/or subclasses 140 of a classification problem (e.g., the documents may be relevant or non-relevant to any number of classes 130 and/or subclasses 140 of a classification problem). Thus, the user 210 reviewing the documents in the initial document set may submit multiple user coding decisions indicating whether the documents in the initial document set are to be associated with any particular class 130 or subclass 140.

Based on user coding decisions that were specified, the system may derive and create document information profiles for the documents and/or classifiers at step 403. In some embodiments, the document information profiles derived from the user coding decisions may include a vector or array derived using a 4-gram technique which is described below. The description of the document information profile generator 330 and/or a classifier generator 340 provides with regard to how the user coding decisions 555 may be utilized in creating document information profiles and classifiers.

Generally speaking, the document information profile and classifier may be utilized by the classification system to determine whether or not a document should be included as a member of a class or subclass. These concepts are discussed in further detail below.

Initial document set generator 320 may communicate and coordinate with document manager 310 to access documents from document collection 120. For example, initial document set generator 320 may query document manager 310 to get a list of available files from document collection 120. Additionally, initial document set generator 320 may issue commands to document manager 310 in order to retrieve files from document collection 120.

In certain embodiments, e.g., when merging active learning into a single phase, generation and review of initial document sets is not performed and instead classification system 100 may use an iterative active learning approach.

User Interface for Review of Initial Document Sets

Figure 5B:
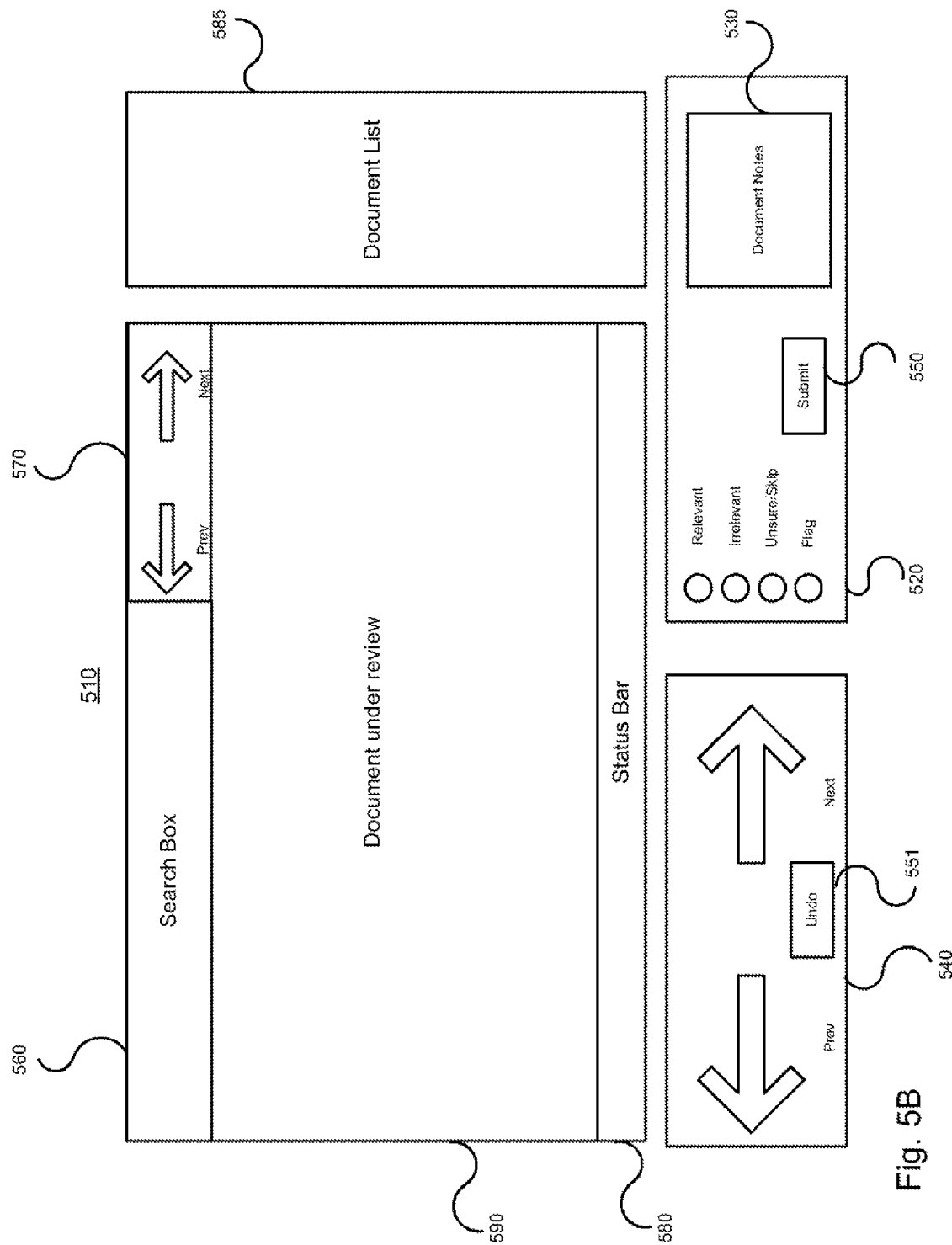
FIG. 5B is a pictorial diagram illustrating a user interface for reviewing documents and entering user interface commands according to certain embodiments.

FIG. 5B illustrates an exemplary user interface 510 which allows user 210 to navigate through the documents of an initial document set with the purposes of allowing user 210 to make coding decisions 555 of FIG. 5A and capture those coding decisions for each document in an initial document set. Documents from document collection 120 that have been selected or added to any initial document set may be presented to the user through this interface.

User interface 510 preferably corresponds to the interface 1011 of FIG. 10. User interface 510, which may include a window or pane for displaying an image of the current document under review 590, the text thereof, or a subset of the document with a link to the whole. Document display windows may include a scroll bar for translating the current document under review, should it be too large for display window.

User interface 510 may also include a number of user interface review elements for entering user coding decisions 555. For example, user interface review elements may include radio buttons or checkboxes 520 for indicating a coding decision for the document under review 590 (e.g., relevant, non-relevant, unsure/skip, flag). Some status elements, that may be used to indicate the coding decisions 555, may be selectable in a mutually exclusive fashion (relevant, non-relevant, unsure/skip), while some status element may be used in conjunction with others (e.g., flag). User interface elements may also include a text or edit box 530 for adding notes to a user coding decision 555 of FIG. 5A, which allows for an elaboration on a decision to flag a document. Similar user interface elements may be presented for each class 130 and/or subclass 140 of a classification problem. Alternatively, user 210 may be presented with a user interface review element (e.g., list box and/or arrows) for selecting a class 130 and/or subclass 140 of the classification problem and selecting, applying and recording user coding decisions 555 of FIG. 5A. In some embodiments, instead of indicating a class 130 or subclass 140 for a user coding decision 555 by having user 210 select a class 130 or subclass 140 using a suitable interface element, user interface 510 informs the user of the class 130 or subclass 140 being reviewed. For example, user interface 510 may indicate the current class 130 or subclass 140 under review to user 210 using a suitable interface element (e.g., status bar).

User interface 510 may also include a number of interface elements 540 for navigating an initial document set. For example, next and previous buttons or arrows for changing the document under review 590 (e.g., the next or previous document in an initial document set). A submit button 550 may also be presented for recording user coding decisions 555 of FIG. 5A. Use of navigation or other user interface elements may trigger error-checking code or subroutines to apprise the user of a possible error condition (e.g., no coding decision made). A user interface for review of initial document sets 510 may also include an undo operation. An undo operation may be executed by user 210 interfacing with an appropriate interface element for example, undo button 551. An undo operation may reverse the effects of the immediately preceding user coding decision 555. An undo operation may also, or alternatively, change the document under review 590 (e.g., reverting back to a previous document). An undo operation may be used iteratively to undo the effects of a series of user interface operations.

Additionally, user 210 may be presented with interface elements (e.g., a search box 560) for finding, locating and highlighting text strings within the current document under review 590. Those documents of an initial document set that are selected using a keyword-type search may also be displayed with those keywords found in document under review 590 highlighted in the display window. User 210 may also be presented with an interface 570 for skipping from one found keyword or text-string to another.

User interface 510 may also include a status bar 580 indicating, for example, title, filename, and/or number of the current document under review 590, along with the size of the initial document set. A document list 585 may also be provided for displaying the names of documents in an initial document set. User 210 may change document under review 590 by selecting a document from document list 585 such that document under review 590 becomes the document selected by user 210 from document list 585.

FIG. 5A illustrates how user interface 1011 (which corresponds to item 510 of FIG. 5B) may communicate and coordinate with document manager 310 to access documents of an initial document set from document collection 120. For example, user interface 510 may issue commands to document manager 310 in order to retrieve files from the document collection 120 when the user attempts to navigate to a new document using interface elements 540 or document list 585. As illustrated in FIG. 5A, user coding decisions 555 for each document under review 590 are captured by the classification system and may be appended to the document or stored in a separate file or database. Capture of user coding decisions 555 may be implemented at document manager 310.

The document image or text and any user interface review elements may be implemented as panes of a single window, separate windows, or a combination thereof. Some or all of the user interface elements may be presented as an overlay on top of the current document to reviewed, such that the user interface review elements will remain stationary while the user scrolls through the document. User 210 may given the option of selecting a number of different layouts for user interface 510.

User interface 510 may be implemented in any suitable programming language (e.g., C, Java) or in a browser (e.g., Internet Explorer, Chrome, Firefox, Safari) using a document markup language (e.g., HTML or XML). User interface 510 may be a natively programmed application or served to a user device from a remote location.

Alternatively, user interface 510, may be simple and minimalist. For example, user 210 may only have the ability to choose one of two options (e.g., relevant or non-relevant) using a suitable interface element (e.g., button, radio button, check box, keyboard key, or touch interface gesture). In some embodiments, user interface 510 is a terminal (text) interface. A simple implementation of user interface 510 allows classification system 100 to dedicate further resources to document processing, thus allowing for faster operation of the platform.

User interface 510 may also map the operations of graphical elements to keystrokes on a keyboard. For example, in some embodiments, user 210 indicates relevance by pressing an identified key on a standard keyboard (e.g., "a") and indicates non-relevance by pressing a different key (e.g., "g"). By mapping the operations of graphical elements to keyboard keys, a user 210 can process documents faster by avoiding time consuming user interaction with a GUI pointing device (e.g., a mouse).

Some or all user interface elements may be mapped to a gesture recognition system, whereby the user may navigate an initial document set or make user coding decisions 555 by issuing a swipe or sweep gesture on a touch sensitive surface (e.g., touchscreen or touchpad) or in view of a camera, instead of using a button or other user similar interface element. For example, vertical swipes may indicate membership (e.g., relevance or non-relevance) while horizontal sweeps may change the document under review 590. Gesture recognition may be performed by the software of user interface 510 or in a separate software module or library that interoperates with user interface 510. In certain embodiments, voice recognition is performed where a user performs actions by speaking words or phrases. For example, a user may indicate relevance by speaking a word or phrase and non-relevance by speaking a different word or phrase.

In other embodiments, a user 210 may not need to review any initial document sets. For example, a randomly selected subset of documents from document collection 120 may be used to approximate a set of non-relevant documents. This randomly selected set bypasses user determination and coding and is instead coded by classification system 100 of FIG. 1 to be non-relevant (e.g., belonging to class N) and is thus also non-relevant to all subclasses 140 of the classification problem. Subsequent review and classification by classification system 100 or a user 210 may alter this coding decision. In other embodiments, an initial document set may merely be augmented by a random selection of documents from the document collection 120 that are automatically coded by classification system 100 to be non-relevant instead of being reviewed by the user for coding decisions 555.

In certain embodiments, e.g., when merging active learning (discussed below) into a single phase, user interface 510 of FIG. 5 need not be provided and instead classification system 100 of FIG. 1 may rely solely on an active learning interface for document review during active learning iterations.

Feature Extraction/Developing a Document Information Profile

A document information profile may represent the features of a document. Document features may be found in the content of the document (e.g., the text). Additionally, document features may be found within metadata associated with the document (e.g., file timestamps, revision history). Preferably, a document information profile is generated for a document without using aggregate information from other documents in the collection.

A document information profile may be generated for all of the documents in the document collection 120 or a subset of documents from document collection 120 (e.g., documents in the initial document set). In certain embodiments, the document information profile generator 330 (which may also be referred herein as the "feature extractor") illustrated in FIG. 3 may be utilized to generate the document information profiles.

The document information profile may be utilized in several different ways. For example, the document information profile may be utilized to determine an appropriate manner of classifying a document into different classes and subclasses. To facilitate this, the document information profile may be analyzed to produce scores for a document that can be utilized to determine whether or not the document is to be assigned to particular classes and/or subclasses (e.g., whether of not the document is relevant or non-relevant with respect to a particular class or subclass).

A document information profile may also be utilized to create classifiers. Generally speaking, a classifier may be used to categorize or classify other documents in a document collection as being relevant or non-relevant to one or more classes or subclasses. Thus, document information profiles may be analyzed in order to create classifiers that can be used to associate documents with classes or subclasses. Further details are provided in the subsequent sections provided below which describe the manner in which document information profiles may be used to classify documents and derive classifiers.

The manner in which a document information profile is generated may vary. In some embodiments, the document information profile may be generated using a overlapping byte 4-gram technique or an arbitrary length N-gram technique which serve to extract certain patterns or features from the documents. In certain embodiments, the profiles may be pre-processed to facilitate feature detection and extraction. After a document information profile has been created for a document, the document information profile may be stored as part of the document or stored in a separate file or database.

Figure 6:
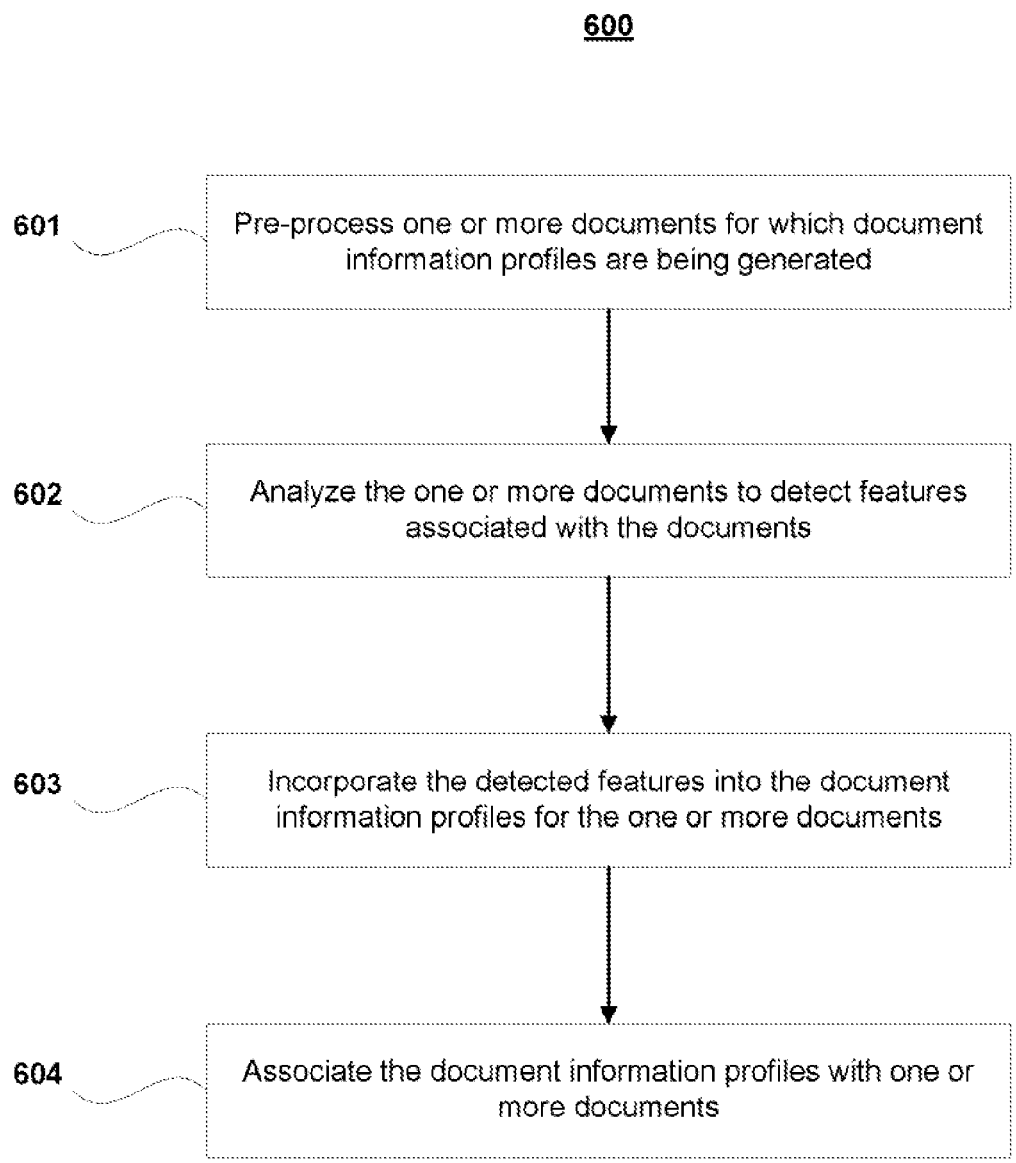
FIG. 6 is a flow diagram illustrating a process for developing document information profiles according to certain embodiments.

FIG. 6 illustrates an exemplary method 600 for generating a document information profile. In certain embodiments, the method 600 of FIG. 6 may be executed by document information profile generator 330.

In some embodiments, one or more documents may be pre-processed before document information profiles are generated for the documents at step 601. The pre-processing may involve converting all alphabetical characters of a document into a single case and compressing strings of non-alphanumeric characters into a single character (e.g., a space character). It should be noted that the pre-processing operations are optional and may not be implemented in certain embodiments.

Next, the documents are analyzed to detect one or more features associated with the document at step 602. In certain embodiments, the document information profile generator 330 or other component may apply a technique such as the overlapping byte 4-gram technique, e.g., which is described in Cormack, in analyzing the document. Other techniques, such as an arbitrary length N-gram method, may also be utilized to analyze the document.

Detecting features according to the overlapping byte 4-gram technique may involve analyzing a document to detect the occurrence or non-occurrence of particular N-grams from a set of N-grams. For example, in a 4-gram technique, the string "Hello World" would have 4-grams of (Hell, ello, llo_, lo_W, o_Wo, _Wor, Worl, orld, etc). By using an overlapping byte N-gram technique, documents may be treated as a mere sequence of bytes without regard to the meta information or markup of the document itself (thus, making this technique suitable for language independent processing).

In certain embodiments, the occurrence or non-occurrence of a particular N-gram may be treated as a binary value. In alternative embodiments, the document information profile generator may count the number of occurrences of a particular N-gram or may record an exponential term frequency weight for the number of occurrences of an N-gram.

The document information profile for a document may be represented as a vector or array with length (dimensionality) matching the number of unique N-grams. However, each N-gram includes N×8-bits of data. Thus, for a 4-gram technique, there are 32-bits of data and therefore $2^{32}$ or 4,294,967,296 unique types of 4-grams. Pre-processing the document in the manner described above (e.g., by converting to a single case and/or compressing non-alphanumeric characters) reduces the number of unique N-grams and the corresponding dimensionality of the array or vector associated with a document information profile.

Additionally, the dimensionality of a document information profile may be further reduced by an optional pre-processing step 610 which further records the frequency of unique N-grams in the entire document collection 120 (or a subset of document collection 120). This additional pre-processing step may calculate and store a feature list representing N-grams having a document frequency greater than a certain threshold. In certain embodiments, 4-grams having a document frequency of greater than 0.5 are added to feature list and ignored (e.g., the 4-grams _and/and_may be ignored and not counted). The feature list may be used to ignore (e.g., not count or recognize) those N-grams appearing on feature list.

When analyzing the documents in step 602, a hashing technique may also be used to map the occurrence(s) of multiple unique N-grams onto a single element of a vector or array that is smaller than $2^{8*N}$. In certain embodiments, a hashing technique is used to reduce the dimensionality of document information profile to be approximately $10^8$. The hashing technique may map N-grams randomly or may take into account N-gram frequency information derived from the pre-processing operations. For example, N-grams can be distributed such that the hashing technique balances the information content of each hash value such that the frequency of N-grams assigned to any given hash value is approximately equal to the frequency of N-grams assigned to the other hash values. Hashed N-grams may be counted in a manner similar to un-hashed N-grams.

In certain embodiments, the document information profile is generated using a fixed prefix (e.g., the first 30K bytes) of the document. In alternative embodiments, the whole document or another portion (or portions) of the document is utilized to develop a document information profile. For example, the document may be broken into consecutive or overlapping 30K fragments, known as tiles or shingles, respectively. In order to avoid the overhead of serial operating system calls (e.g., file open and close), the document information profile generator 330 may open and concatenate those portions of the documents (e.g., the first 30K bytes) to be processed into a single file or input stream.

In certain embodiments, the speed and responsiveness of the classification effort is improved through the use of classification vectors rather than matrices, with further improvements realized by reducing the dimensionality of the vector space and/or by using binary values to represent the vector elements. For example, when scoring the documents of the collection (discussed below), reducing the dimensionality of the classification vector may reduce the number of multiplications required to calculate a score. Furthermore, representing the elements of the classification vector and/or document information profile as binary values may also allow for the use of the bitwise type operations to generate a score instead of integer math operations, potentially resulting in improved scoring efficiency.

In some embodiments, the user may be able to select from any number of pre-determined or installed equations or methods in order to analyze documents to detect features. Alternatively, a user may be able to override or provide a new feature extraction procedure by entering or providing a software method or subroutine (e.g., in a scripting language or object code).

After the one or more documents have been analyzed and the features in the documents have been detected, the detected features are incorporated into document information profiles for one or more of the documents at step 603. In some cases, document information profiles may be created for all of the documents in a document collection 120. In other cases, document information profiles may only be created for a subset of documents from document collection (e.g., only for the initial document set).

Document information profiles may be generated by a classification system (e.g., classification system 100). Alternatively, a classification system may receive document information profiles from another source (e.g., a network, or storage medium). Document information profiles may be generated once and stored in memory, flash memory or disk and recalled at a later time. Alternatively, document information profiles may be generated as needed, for example, a document information profile may be generated before a document is scored (discussed below) or when a document is added to the collection.

The document information profiles may be associated with one or more of the documents at step 604. The document information profiles may be associated with the documents in different ways. For example, the document information profiles may be appended to the document for which the document information profile was generated. In other embodiments, a document information profile may be stored in a separate file or database and correlated with the document for which the document information profile was created.

Calculating Classifiers

The document information profiles, described in the previous section of this disclosure, may be used in conjunction with user coding decisions 555 to calculate, incrementally update, or determine classifiers for a classification problem. A classification problem may be associated with one or more classifiers. For example, there may be one or more classifiers for each class or subclass defined for a classification problem. A classifier provides a basis, at least in part, for determining whether or not a particular document is relevant or non-relevant to one or more classes or subclasses. In certain embodiments, the classifier may represent a vector value that is generated from a document information profile and one or more user coding decisions associated with a document. Classifier generator 340, illustrated in FIG. 3, may be configured to calculate, update, or otherwise determine a classifier in the manner described herein.

Figure 7:
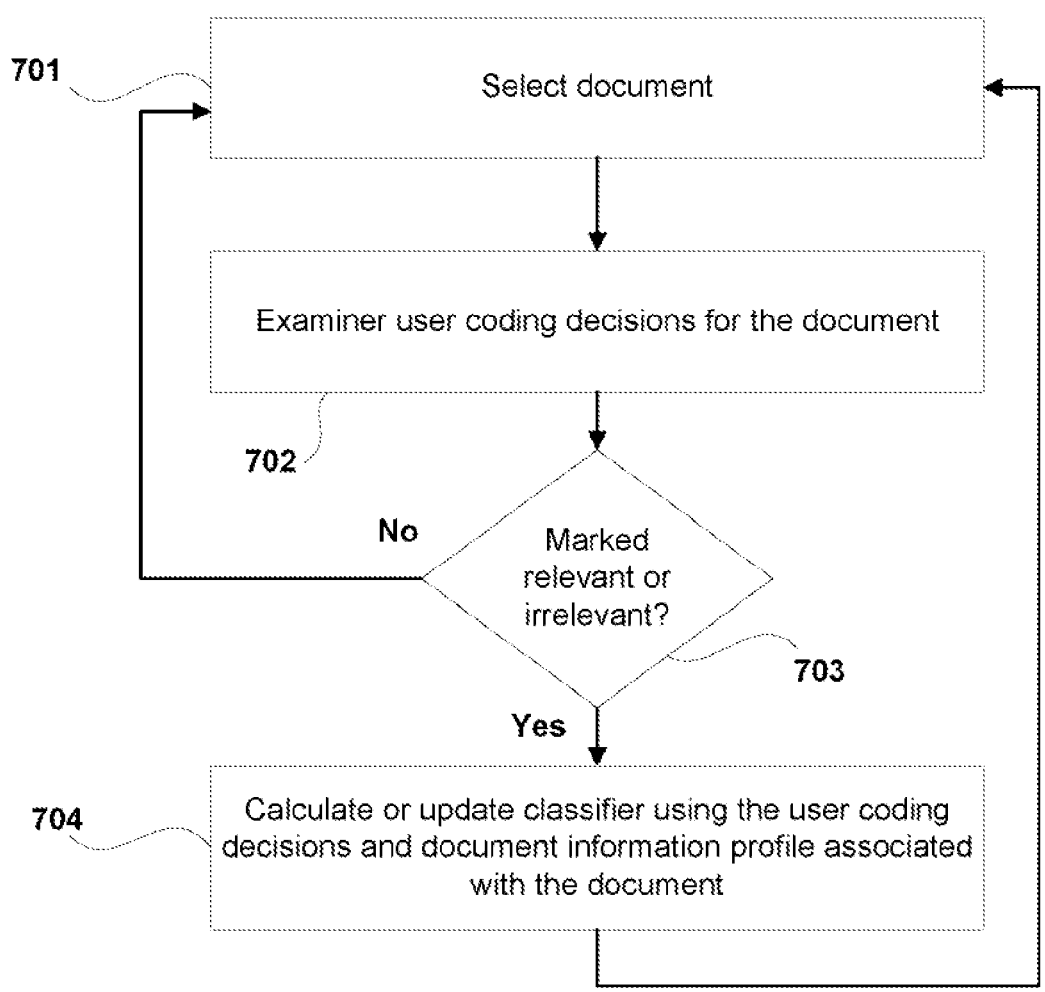
FIG. 7 is a flow diagram illustrating a process for calculating or updating classifiers according to certain embodiments.

FIG. 7 is an exemplary method for 700 calculating or updating a classifier in accordance with certain embodiments. This method 700 may be utilized to update one or more classifiers associated with each class 130 and/or subclass 140 of a classification problem. Furthermore, this method 700 may be executed by the classifier generator illustrated in FIG. 3.

As shown therein, the method 700 begins at the start block and proceeds to step 701. In step 701, a document is selected for analysis. As will be explained in further detail below in the following section of this disclosure, the document which is selected may represent a document that is being analyzed to determine whether the document is a member of a particular class or subclass.

Next, the user coding decision associated with the document is retrieved and examined at step 702. User coding decisions 555 for a particular document may include decision data (e.g., which may be specified by an expert or other user) that indicates whether the document has been deemed to be relevant or non-relevant with respect to a particular class 130 or subclass 140 of a classification problem. The user coding decision may also indicate that a user 210 had skipped the document or was unsure as to whether the document was relevant or non-relevant.

Thus, a determination is made as to whether the user coding decision indicates that the document had been marked relevant or non-relevant at step 703. If the document had not marked relevant or non-relevant (e.g., the user coding decision indicates that the user reviewing the document had skipped the document or was unsure as to whether the document was relevant or non-relevant), then the document will not be utilized to update the classifier. In this scenario, the method 700 may proceed back to step 701 where the next document is selected for review.

On the other hand, if it is determined that the user coding decisions indicate that the document had been marked relevant or non-relevant with respect to the particular class or sub-class that is associated with the classifier, then the classifier is calculated or updated at step 704. In certain embodiments, the classifier may be calculated using both the user coding decisions and the document information profile associated with the document. By utilizing documents that have been marked as relevant or non-relevant to update the classifier, the classifier is able to filter documents received in the future more effectively.

In certain embodiments, the classifier may be calculated or incrementally updated using a gradient descent or ascent technique. Gradient descent/ascent is a first order optimization algorithm capable of finding local minima/maxima. The equation provided below demonstrates an exemplary manner in which the user coding decisions and the document information profile associated with the document may be utilized to calculate or update a classifier. The classifier, represented by vector R, may be calculated using a gradient descent update rule using the equation, $$\beta \leftarrow \beta + \left(c - \frac{1}{1 + e^{-score}}\right) \cdot \delta \cdot X,$$

where X is the document information profile, c=1 for a user coding decision 555 that indicates the document is a member of (e.g., relevant) a class 130 or subclass 140, c=0 for a user coding decision 555 that indicates the document is not a member of (e.g., non-relevant) a class 130 or subclass 140, δ is a learning rate, and $$\frac{1}{1 + e^{-score}} \approx Pr[\text{relevant}].$$

The "score" which appears in the equation above refers to a score calculated for a particular document used to update the classifier. Alternatively, any suitable objective (gain or loss) function may be used in order to update or calculate a classifier. Examples include hinge loss functions, square loss functions, and absolute loss functions.

In other embodiments, the classifier may be calculated using a Naïve Bayes filter according to the equation for each element i of the vector representing the document information profile:

$$\beta_i = \log \frac{|\{\text{relevant documents with } X_i = 1\}| + \varepsilon}{|\{\text{relevant documents with } X_i = 0\}| + \varepsilon} -$$

-continued $$\frac{|\{\text{non-relevant documents with } X_i = 1\}| + \varepsilon}{|\{\text{non-relevant documents with } X_i = 0\}| + \varepsilon}$$

In further embodiments, a classifier may be calculated using $L_2$-regularized logistic regression. In some embodiments, more than one classification calculation procedure may be utilized yielding more than one classifier.

In certain cases, the user 210 may be able to select from any number of system installed equations or methods for calculating a classifier. Alternatively, users may be able to enter their own equation or provide a software method or subroutine (e.g., in a scripting language or object code) for calculating a classifier using a document information profile or other information as needed.

After one or more classifiers have been calculated or updated, the classifiers for each class 130 and/or each subclass 140 of a classification problem may be stored in a file or in a database along with other data. The method then proceeds back to step 701 and the next document is selected for review.

Classifying Documents/Classification Process

As mentioned in the previous section, a classifier may be utilized as part of a classification procedure that determines whether a particular document is relevant or non-relevant with respect to one or more classes or subclasses. Some or all of the documents in the document collection 120 may pass through the classification procedure.

Figure 8:
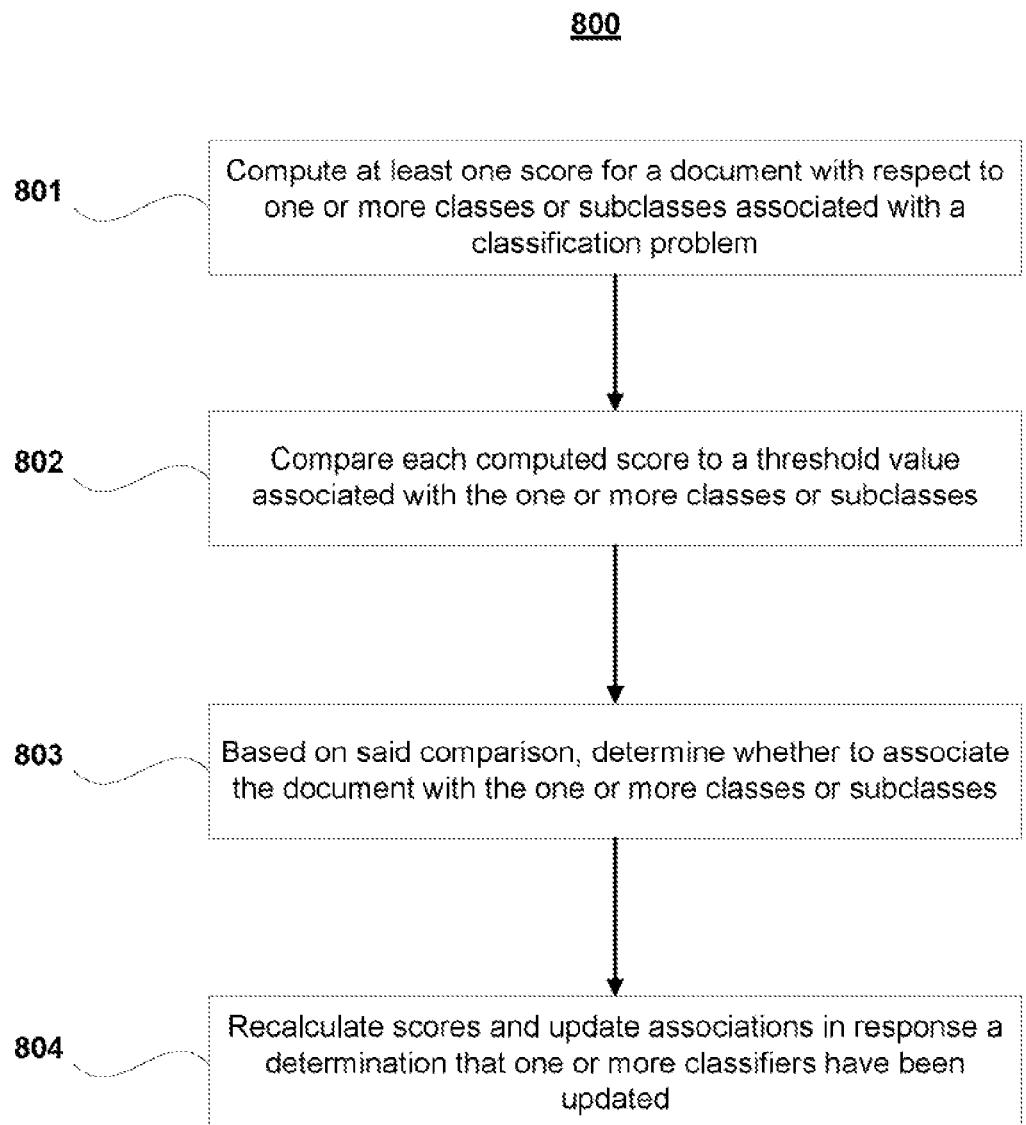
FIG. 8 is a flow diagram illustrating a process for scoring and classifying documents according to certain embodiments.

FIG. 8 is an exemplary method 800 for classifying a document in accordance with certain embodiments. Initially, at least one score may be computed for the document with respect to one or more classes or subclasses associated with a classification problem at step 801. In some embodiments, one or more scores are computed for each class or subclass that is associated with the classification problem. Generally speaking, a score will be utilized to determine whether the document is to be associated with a class or subclass (e.g., whether the document is relevant or non-relevant for a particular class or subclass).

The manner in which a score is computed may vary. In certain cases, a document information profile associated with the document will be utilized, in conjunction with a classifier that is associated with a particular class or subclass, to compute the document score with respect to a particular class or subclass. Thus, as a preliminary step (not shown in FIG. 8), the method 800 may further include retrieving or generating a classifier for one or more classes or subclasses, and/or retrieving or generating a document information profile associated with the document.

In certain embodiments, one or more scores may be calculated for each document using a classification algorithm that incorporates classifiers for each class 130 and/or subclass 140 and the document information profiles associated with the documents. For example, a score may be calculated for a particular class 130 or subclass 140 according to the classification formula:

$$\text{score} = \beta \cdot X \approx \log \frac{Pr[\text{relevant}]}{Pr[\text{nonrelevant}]},$$

where β is the classifier for the particular class 130 and/or subclass 140 (which may be calculated by classifier generator 340) and X represents the document information profile (which may be calculated by document information profile generator 330). It should be recognized that other schemes may be utilized for calculating such scores.

Each score which is computed for the document may be compared to a threshold value associated with one or more classes or subclasses at step 802. For example, if a classification problem has three classes, separate scores may be computed for each class and the scores may be compared to three separate threshold values that are associated with each of the particular classes. The manner in which the threshold values are computed or determined is discussed below in a subsequent section.

Based on the comparison of the document scores with the threshold values, a determination may be made regarding whether or not to associate the document with one or more of the classes or subclasses at step 803. For example, in certain cases, if the score exceeds a threshold value associated with a particular class or subclass, the document may be associated with the class (e.g., the document may be determined to be relevant to the class). On the other hand, if the score does not exceed the threshold value for a class or subclass, the document may not be associated with the class or subclass (e.g., the document may be determined to be non-relevant with respect to the class or subclass). In other embodiments, a score falling below the threshold value may result in document being associated with a class or subclass, while a score exceeding the threshold value may result in the document not being associated with the class or subclass.

Threshold values may be set differently for each class 130 and/or subclass 140. Documents with scores that do not meet the threshold for any class 130 or subclass 140 may be classified as a member of class N (non-relevant to the classification problem). Thus, class N (non-relevant) does not require a classifier.

In some embodiments, the scores for each document will be recalculated in response to a determination that one or more classifiers have been updated or changed at step 804. In some cases, this may result in a reclassification of the documents with respect to the classes and subclasses 140. In other words, updating a classifier may result in a document being disassociated with a class or subclass of which the document was previously a member, or may result in the document being associated with a new or different class or subclass.

In some embodiments, classification process may continue to run until all documents in document collection 120 are processed and classified. In other embodiments, classification process may stop when a specified or determined number of documents have been classified by classification process. In further embodiments, classification process may stop when classification process has classified a pre-determined number of documents into a particular class 130 or subclass 140 or a particular set of classes 130 or subclasses 140. In even further embodiments, classification process may stop when a new user coding decision 555 is received and the user coding decision 555 would affect one or more classifiers. Further discussion surrounding the termination of the classification process can be found below.

Document information profiles, classifiers, classification decisions, and/or priority queues may be stored in a file or in a database along with other data. Capture of document information profiles, classifiers, classification decisions, and/or priority queues may be implemented at document manager 310.

Active Learning

Active learning systems are able to update classifiers, and hence the training set, using further human review of selected documents. Documents may be selected for review based on one or more factors and/or algorithms discussed further below. The selected documents are then reviewed and classified as relevant or non-relevant by the user, and this additional classification is then used to update the classifier, thereby further improving the effectiveness of the classification system.

During the specification of a classification problem, or at anytime thereafter, a user 210 may request that classification system 100 use an active learning process during classification. User 210 may instruct the system to use active learning by interfacing with classification system 100 using a GUI, a web-interface presented by the classification system or through a command line or any other suitable mechanism. In certain embodiments, classification system 100 may default to using active learning.

FIG. 9 provides an illustration of the steps of exemplary method 900 which may be performed by an active learning module 360 of FIG. 3. When classification system 100 of FIG. 1 is in active learning mode, active learning module 360 may select a document from document collection 120 of FIG. 1 at step 910 according to any number of methods. Any document selection method may be used at any active learning iteration. For example, active learning module 360 may select a document randomly, by its score, or by its position (e.g., first, last, middle) in one or more priority queues (discussed further below). Alternatively, a user 210 may select a document from document collection 120 using a user interface 1012 provided by classification system 100. For example, user interface 1012 may list the documents of document collection 120 in a window or pane of a window in a GUI. The list of documents presented to the user may be ranked or ordered. For example, user 210 may enter keywords or rules into a GUI window or text box. Document collection 120 may be searched with the entered keywords using an algorithm such as BM25 (OKAPI) or any other suitable algorithm in order to provide relevance rankings. The document list presented to user 210 may be ranked accordingly. Alternatively, the document list may be ordered according to scores calculated by classification process 350 (e.g., using priority queues). The order of the list presented to user 210 may be updated in real-time.

In certain embodiments, e.g., when merging active learning into a single phase, document selection step 910 may be used to select a document that contributes to the overall objectives of classification system 100, namely, achieving high recall, high precision and using minimal human effort. For example, document selection step may select a document based upon its position in a priority queue. For instance, to select the most likely relevant document to a class or subclass, a document may be selected at step 910 from the top of a priority queue. High precision and high recall can be realized by minimizing overtraining and identifying additional types of relevant documents. Assuming that documents near the top of a priority queue are similar, it may be beneficial to select a document from a position near the top of a priority queue or elsewhere within the queue, as opposed to purely from the top of the queue, or a random document to achieve greater sampling diversity.

To determine which document to select from a priority queue, different techniques may be utilized. For example, the process may skip ahead to a document based on the frequency or number of documents having a similar score that were coded similarly in the same class or subclass. Alternatively, the process may skip documents having relatively similar scores to another set of documents that may be separated by a gap in the queue. Alternatively, a document may be selected by evaluating the information content of candidate documents. For example, a distance may be calculated between the candidate document and the previously selected document or a series of previously selected documents. More specifically, such a distance may be calculated using the document information profile of the documents and a weighting technique (e.g., nearest neighbor, cosine, Jaccard index). To avoid over-training, a document may be selected when the distance is inside (similar) or outside a boundary (dissimilar). Alternatively, some other techniques used in rule-based or unsupervised learning techniques may be used (e.g., clustering, threading). For example, documents of the collection may be clustered based upon their similarity and a document may be selected at random from a cluster different from that of the previously selected document or the series of previously selected documents. A document may also be selected by using received user coding decisions. For example, a random document may be selected when a certain percentage of received user coding decisions in a series of user coding decisions have indicated relevance (or non-relevance).

In certain embodiments, diversity may be achieved by rotating the document selection among a number of different ranking techniques. For example, at one iteration, a document may be selected from the results returned by a keyword search of the document collection or by comparing the documents with an exemplary document (e.g., a document from or outside of the collection) provided by the user. At a subsequent iteration, a document may be selected using the results returned by a different keyword search of the document collection, according to a rank in a priority queue, or by a comparison with a different exemplary document provided by the user. Move-to-front pooling may be one technique used to rotate document selection among different ranking techniques. More specifically, move-to-front pooling prioritizes the ranking techniques that are used for document selection. For instance, move-to-front pooling may prioritize rankings techniques that are determined by the human reviewer to yield a higher preponderance of relevant documents, for example, through analysis of user coding decisions.

Alternatively, a document may be selected at step 910 according to how closely scores for a document are to one or more calculated threshold values that are used to classify documents from the document collection into classes or subclasses, preferably using a calculated threshold that maximizes a stopping criterion. For example, document selection 910 may select the document closest to the threshold (i.e., through uncertainty sampling).

After selection by an active learning module or a user, the document or a reference to the document, may be transmitted to user 210 at step 920 for review. The user may review and code the document through an interface (e.g., active learning interface 1012). In certain embodiments, the interface may be a graphical or textual user interface presented on a display coupled to the classification system. Tightly coupling document selection and presentation (e.g., at the same computer) allows the classification system to minimize latency between active learning iterations. The document presented for review may be retrieved via a request to document manager 310 of FIG. 3.

In some embodiments, a document review push process 1020, as illustrated in FIG. 10, may be running in the background on a user's computing device (e.g., client device 220 of FIG. 2). For example, document review push process 1020 may be listening in the background on an open network port for incoming data or messages from active learning module 360. After a document is selected at step 910, active learning module 360 may identify a user for classifying the document, and may attempt to open a connection with document review push process 1020 running on the selected user's client device 220.

A user or set of users who may be selected by the system to classify documents retrieved at step 910 of the active learning process may be specified by a prior user 210, for example, during initialization of the classification problem or at any later time. Alternatively, a user may register his or her availability to classify documents with an active learning module 360. User 210 may limit his or her availability, for example, by specifying a specific classification problem, certain document types, a specific document file extension or time during registration with active learning module 360.

When a connection is made between active learning module 360 and document review push process 1020, document review push process 1020 may be brought from the background into an active running state on client device 220. Document review push process 1020 may receive data from active learning module 360 and present the document and any other data (e.g., background data such as a problem description or other exemplary highly scored documents) to the user using an active learning interface such as interface 1012 of FIG. 10. In some embodiments, the transition from background to foreground process involves the presentation of a graphical user interface on the client device 220. A similar background process technique may be used for pushing documents of an initial document set to user 210 in order to allow user 210 to make user coding decisions 555 for the documents of an initial document set.

In some embodiments, active learning module 360 may send a message to user 210, indicating that a document is ready for review. For example, active learning module 360 may send a text message or email with a URL or attachment for the document that needs to be reviewed. An active learning interface 1012 may be presented to the user when user 210 clicks or otherwise activates the URL or attachment presented in the message. A similar messaging technique may be used for allowing user 210 to make user coding decisions 555 for documents in an initial document set.

In active learning mode, active learning module 360 is able to receive user coding decisions 555 for the document (e.g., relevant or non-relevant for a class 130 or subclass 140 of the classification problem). When a user coding decision 555 is received from user 210, active learning module 360 may update the classifiers using classifier generator 340. In some embodiments, classification system 100 will wait indefinitely for a user coding decision 555. In alternative embodiments, classification system 100 will wait for a user coding decision 555 for a specified time period and, if no response is received from user 210 within this time period, classification system 100 will stop waiting for the user's response (i.e., timeout) and may not update any classifiers.

In some embodiments, instead of waiting for a user coding decision 555 from user 210, active learning module 360 may fork additional copies of classification process 350 at step 935. These forked copies represent parallel document classification paths. Each forked copy of classification process 350 will represent a prediction of the user coding decision 555 (e.g., relevant, non-relevant, unsure/no response) for the selected document as to a particular class or subclass of the classification problem. Thus, taken as a whole, forked processes 350 represent the entire user decision space for the selected document with regard to all FIG. 1 classes 130 and subclasses 140 of a classification problem. In some embodiments, original classification process 350 may be terminated or suspended after a document is selected.

While running, each forked classification process 350 may maintain local copies of classification dependent data (e.g., classifiers, priority queues, and/or document scores). Local copies of classification dependent data are considered local to a forked classification process 350 if they are not affected by another forked classification process 350 during the period of time between forking classification process 350 and receiving a user coding decision 555, or between forking and the occurrence of a timeout waiting for user coding decision 555 for the document.

Predicted classifiers and other data that maps onto a predicted user coding decision 555 for the selected document for each forked classification process 350 may be generated at step 915 before running forked classification processes 350. For example, the predicted classifiers used by each forked classification process 350 will be modified by classifier generator 340 using the method described according to a predicted user coding decision 555. More specifically, for a two-class classification problem, forked process A may use local predicted classifiers updated by classifier generator 340 to handle the situation in which user 210 may find the selected document relevant (e.g., a member of class 1). Similarly, forked process B may use local predicted classifiers updated by classifier generator 340 to handle the situation in which user 210 may find the selected document non-relevant (e.g., a member of class N). Forked process C may use local predicted classifiers that are not updated (corresponding to a situation where the active learning module 360 potentially does not receive a user coding decision 555 within a specified time period, or the user coding decision 555 may not indicate whether or not the document was relevant). A similar forking system can be used for classification problems with additional classes 130 and/or subclasses 140.

Each forked classification process 350 may, at step 940, classify documents from document collection 120 using their own local data copies (e.g., predicted classifiers, priority queues) substantially as if it is the only classification process that is running.

If a user coding decision 555 is received or a specified time period is exceeded waiting for a user coding decision 555 for the selected document, the active learning module 360 may, at step 950, terminate or suspend all forked classification processes 350 which are inconsistent with the user coding decision 555.

Global system data may be updated by active learning module 360 at step 960, for example, by copying or changing a pointer or reference to reflect the local data calculated by the forked classification process 350 that matched the (un)received user coding decision 555 for the selected document. In other words, the classification data generated by the forked process 350 mapping to the correct prediction for user coding decision 555 should be identified and propagated forward. After (non)receipt of user coding decision 555, active learning module 360 may start a new classification process 350, or original classification process 350 may be restarted. Started or restarted classification process 350 may use classification data updated during step 960.

In certain embodiments, classification system 100 of FIG. 1 may nominate a classification process 350 as a master classification process. For example, before active learning module 360 is executed for the first time, a classification process 350 may be created and nominated as the master classification process. During active learning, master classification process 350 corresponds to the prediction that a received user coding decision 555 for the selected document will not have the effect of modifying any classifier for a class 130 or subclass 140 (e.g., skip, unsure) or a timeout situation will otherwise occur. During active learning, as explained above, active learning module 360 will fork other processes that represent a predicted user coding decision 555 for the document (i.e., those responses that would require classifier generator 340 to modify or update a classifier) for the document (e.g., relevant or non-relevant). For example, for a two-class classification problem, initially only a master classification process 350 is running. After document selection, classification processes A and B are forked representing user coding decisions 555 for the selected document of relevant and non-relevant, respectively. Classification process A updates its local classifiers (and other data as needed) to predict that the user will classify the document under review as relevant. Classification process B updates its local classifiers (and other data as needed) to predict that the user will classify the document under review as non-relevant. Master classification process 350 and forked processes A and B may run concurrently (on the same CPU core/processor or on different CPU cores/processors) or serially. If the user coding decision 555 indicates relevance, process A is promoted to master classification process 350 and its local classification data is propagated forward. If user coding decision 555 indicates non-relevance, process B is promoted to master classification process 350 and its local classification data is propagated forward. However, if the user response is unsure—or no response is received—master classification process 350 remains the same and the classification data calculated by master classification process 350 during concurrent or serial execution with forked processes A and B is propagated forward.

In some embodiments, instead of forking additional classification processes 350, active learning module 360 may fork and maintain local predicted classification dependent data mapping to each predicted user coding decision 555. Classification process 350 is executed serially N-times for each document to be classified, where N represents the space of all predictions for user coding decision 555. For example, for a two-class classification problem, data copy A may use predicted classifiers updated by classifier generator 340 to handle the situation in which user 210 may find the selected document relevant (e.g., in class 1). Data copy B may use predicted classifiers updated by classifier generator 340 to handle the situation in which user 210 may find the selected document non-relevant (e.g., in class 2), while data copy C may be an original classifier for a class or subclass. While awaiting user coding decisions 555, the system may continue to classify documents, and classification process 350 is executed using data copy A for a given document information profile. Thereafter, classification process 350 is executed using data copy B for the same document information profile, and then classification process 350 is executed using data copy C for the same document information profile. The process can be then be repeated for the next document in the collection while awaiting user coding decision 555. The processing of data copies may be interleaved in any manner. For example, classification process 350 may use data copy A to score a number of documents using their corresponding document information profiles, then may use data copy C to score a number of documents using their corresponding document information profiles, then use data copy A again before switching to data copy B. Although the order in which the data copies (e.g., A, B, C) are processed is unimportant, classification data (e.g., priority queues and scores) generated by each successive run of classification process 350 should be maintained separately as with the other forking methods described above. As with the other forking methods, after user coding decision 555 is received or a timeout occurs, the classification data generated by the correct prediction for user coding decision 555 should be propagated forward. As with the other forking methods, this method can be extended to classification problems with any number of classes 130 or subclasses 140.

Active learning module 360 may, at step 970, determine whether a stopping criterion for the active learning process has been met. Determination of whether a stopping criterion is met is discussed further below. If a stopping criterion is not met, active learning module 360 may continue back to step 910 and select a further document. If a stopping criterion is met, active learning module 360 may, at step 980, classify the documents in the collection, for example, by comparing computed document scores with a threshold calculated during stopping criterion determination.

In some embodiments, active learning process 360 may continue to run until all documents in document collection 120 are processed and classified. In an alternative embodiment, active learning process 360 may stop when a specified or determined number of documents have been classified by classification process 350. In a further alternative embodiment, active learning process 360 may stop when classification process 350 has classified a specified or determined number of documents into a particular class 130 or subclass 140 or a particular set of classes 130 or subclasses 140. In a further alternative embodiment, active learning mode may stop when a specified number of user coding decisions 555 have been received.

With limited processing power or a large enough document collection, it may be possible for a user to review a document and submit a user coding decision 555 for the selected document before classification process 350 or forked classification processes 350 complete scoring and classifying each document of the collection. In this case, in order to allow real-time interaction with the classification system 100, it would be more efficient to suspend processing of the remainder of the document collection, and instead use the newly submitted user coding decision 555 along with the new classifiers to be calculated from the newly submitted user coding decision. In certain embodiments, processing time may be allocated to forked classification processes based upon a confidence value associated with the prediction. For example, more processing time may be allocated to a forked classification process predicting that the selected document is relevant to a particular class or subclass when the selected document has a high score for that class or subclass.

For the above situation, in order to maintain high efficiency, the classification process 350 or forked classification process 350 may process the documents of the collection in a particular order, which may be determined at step 930. For example, in this case, each successive iteration of the active learning process may be operating with incomplete information, meaning that scores and classification decisions for all documents of the collection will have not been calculated. More specifically, if selection of the next document for active learning may be based wholly or partly upon the subset of scores calculated by a forked classification process 350 during an unspecified interval (e.g., between selecting a document and receiving a user coding decision), it is preferable to allocate processing time to those documents that will provide meaningful feedback for a subsequent document selection step 910. For instance, after or in response to receiving a user coding decision, a next or further document may be selected using the score or priority queue data calculated by a forked classification process 350 (or forked data copy) corresponding to the received user coding decision.

For example, classification process 350 may process documents by order of rank in one or more priority queues. Alternatively, classification process 350 may process the documents according to how closely scores for the document are to one or more calculated threshold values that are used to classify documents from the collection into classes 130 or subclasses 140, preferably using a calculated threshold that maximizes a stopping criterion. For example, documents may be processed from closest to farthest from the threshold (i.e., using uncertainty sampling). Different processing orders may be used for each forked classification process 350 corresponding to predicted classifier.

As a further alternative, classification process 350 may combine one or more of these techniques to achieve a hybrid ordering scheme. In some other embodiments, documents are processed in a manner designed to complement document selection step 910. For example, if document selection step 910 will use uncertainty sampling on the next iteration, then classification process 350 will also process documents according to uncertainty sampling. In certain embodiments, only a partial ordering is calculated or provided. For example, a certain number of documents may be ordered (e.g., the first 100,000 documents). Alternatively, ordering may stop once a certain cutoff point is reached (e.g., the document score is below a certain threshold). As a further alternative, a number of documents may be ordered based upon an expected user review time for the selected document. For example, a review time may be estimated by the length of the selected document or by keeping a running average of intervals between received user coding decisions.

In certain embodiments, the processing order may be implemented as an input queue which is processed by the one or more forked classification processes. For example, enqueuing a processing order to a forked classification process may start or restart a forked classification process, which may continue to run until all elements of the queue are processed or the queue is otherwise empty. The input queue may be emptied in any number of ways. For example, processing a document listed in the input queue may remove an item from the input queue. In certain embodiments, an input queue may be emptied upon the receipt of a user coding decision.

Incomplete score and priority queue data may be augmented by score and priority queue data from an earlier iteration of active learning in order to calculate an approximate ranking for the priority queues. In order to acquire complete score and priority queue data for all documents of the collection, some iterations of active learning module 360 and classification process 350 may not be suspended when a new user coding decision 555 is received.

The use of predicted classifiers and forking allows classification system 100 to take advantage of the latency inherent in user review of the selected document. Thus, instead of performing calculations after the receipt of the user coding decision, forking allows classification system 100 to have at least a set of partial calculations ready by the time the user coding decision is received. These partial results allow classification system 100 to select a next document in an interactive and real-time manner. By allowing real-time interaction with a user 210 through forking, a single user is able to quickly classify large document collections (e.g., tens of millions of documents). Furthermore, by cutting off processing with the receipt of new coding decisions, the classification system is both more efficient and responsive. Moreover, a single user approach requires less manpower and likely results in an increase in precision and recall. Precision and recall are increased given that the inconsistencies engendered by multi-user coding decisions are avoided. Additionally, a further increase in precision and recall can be achieved because a single user approach allows an expert on the matter to be employed in the classification effort rather than a team of novices or other persons unfamiliar with the subject matter.

Priority Queues

Priority queues may be ordered according to the scores calculated for each document. For example, a priority queue may be ordered from the highest score to the lowest score, from lowest score to highest score, or by the distance of a score to a threshold. Priority queues may also be ordered according to the combined scores for one or more classes 130 or subclasses 140. Priority queues may be ordered during the execution of a classification process or forked classification process 350 or after data from a forked classification process has been identified (e.g., after step 960 of FIG. 9). When ordered during the execution of a classification process or forked classification process 350, priority queues or augmented priority queues can provide a real-time, approximate ranking for the documents of the system (e.g., the top of a queue may point to the most likely relevant document processed to that point in time). In certain embodiments, multiple priority queues may be managed and ordered with each employing a different ordering or ranking technique.

Priority queues may also store document information profiles, the documents themselves, user coding decisions 555 or any other information that may be beneficial (e.g., for easier retrieval). This information can also be stored in the priority queues as a pointer or reference to the corresponding data.

Priority queues may be implemented as a doubly linked list (or any other suitable technique) so that the priority queue may be easily traversed in ascending or descending rank, and provide easy access to elements at both ends of the queue. A priority queue may also be implemented as a linear array or a plain file, achieving very fast traversal from highest to lowest priority, at the expense of slow update. Alternatively, a priority queue may be implemented as a linear array or plain file, in arbitrary order, in which a priority or numerical score is appended to every element, achieving high update speed and fast traversal in the arbitrary order, but slow traversal from highest to lowest priority. As a further alternative, a priority queue may be implemented as a tree structure such as a heap or search tree, of which there are many known implementations, both in RAM and on secondary storage. These tree structures achieve relatively high traversal and update speed, but are not nearly as fast for traversal nor nearly as slow for update as priority queues implemented by linear arrays or plain files.

In certain embodiments, e.g., when merging active learning into a single phase, classification system 100 and active learning module 360 may use augmented priority queues to rank the overall likelihood that a document is a member of a class 130 or subclass 140. Augmented priority queues may be implemented in a similar manner as priority queues described above, and may be used interchangeably with them. In certain embodiments, the order of a priority queue may correspond with a document processing order.

To order the documents, augmented priority queues may synthesize information from a number of sources to compute a document ranking. The documents may be ranked using machine learning, meta-search and/or meta-learning techniques. For example, augmented priority queues may combine one or more scores calculated by a classification process 350 for a document and relevance rankings provided by one or more search algorithms such as BM25 (OKAPI) into a single rank for a document. Relevance rankings may be derived from user input, for example, by the user providing hints (e.g., keyword queries) through a user interface (e.g., user interface 1012). Hints are not required but they may speed the active learning process. In order to combine rankings from one or more search algorithms into a single rank, a reciprocal rank fusion technique may be used. In order to incorporate a temporal search aspect, search rank ordering may be computed using results from an earlier search generated by the one or more search algorithms. For example, search results using the hint "credit swap" may be combined with earlier search results using the hint "mortgage backed securities", resulting in a combined ordering representing how well the documents matched both independent queries. In certain embodiments, multiple augmented priority queues may be managed and ordered with each employing a different ordering or ranking technique. For example, one or more priority queues may be ordered by score, one or more priority queues may be ordered by relevance rankings and one or more priority queues may be ordered by a combination of scores and relevance rankings.

In certain embodiments, priority queues may be ordered using supervised learning algorithms like logistic regression (e.g., stacking). In stacking, the scores or ranks yielded by one or more classifiers or ranking methods for that document are used to represent the features (document information profile) of the document. Stacking is generally superior to (although more complex than) reciprocal rank fusion, in that it tends to give the relevant documents higher ranks, and non-relevant documents lower ranks.

User Interface for Active Learning

The active learning user interface 1012 may be the same or substantially similar to user interface 510 for reviewing initial document sets illustrated in FIG. 5B.

Alternatively, user interface 1012, may be simple and minimalist. For example, user 210 may only may have the ability to select between two options (e.g., relevant or non-relevant) using a suitable interface element (e.g., button, radio button, check box, keyboard key, or touch interface gesture).

As another example, a predominantly vertical gesture (mimicking a head nod) on the touch interface may indicate relevance, while a horizontal gesture (mimicking a head shake) may indicate non-relevance, although any other mapping of gestures to user coding decisions 555 is suitable. In some embodiments, user 210 indicates relevance by pressing an identified key on a standard keyboard and indicates non-relevance by pressing a different key. In certain embodiments, voice recognition is performed where a user performs actions by speaking words or phrases. For example, a user may indicate relevance by speaking a word or phrase and non-relevance by speaking a different word or phrase. In some embodiments, user interface 1012 is a terminal (text) interface. A simple implementation of user interface 1012 allows classification system 100 to dedicate further resources to document processing, thus allowing for faster operation of the platform.

User interface 1012 may also map the operations of graphical elements to keystrokes on a keyboard. For example, in some embodiments, user 210 indicates relevance by pressing an identified key on a standard keyboard (e.g., "a") and indicates non-relevance by pressing a different key (e.g., "g"). By mapping the operations of graphical elements to keyboard keys, a user 210 can process documents faster by avoiding time consuming interaction with a GUI pointing device (e.g., a mouse).

In certain embodiments, e.g., when merging active learning into a single phase, user interface 1012 may include a suitable user interface element (e.g., a text box) to allow a user 210 to enter keywords, rules or regular expressions (i.e., hints). These hints may be used to search document collection 120 using one or more search algorithms (e.g., BM25) in order to identify documents from the collection that meet specified criteria. Search algorithm results may be used by active learning module 360 to create and order augmented priority queues.

In certain embodiments, user interface 1012 may include additional options for skipping the document presented, or for stopping documents from being presented at a client device 220 for a certain time period.

Quality Control

At anytime classification system 100 of FIG. 1 may enter a quality control mode. For example, user 210 may instruct or command classification system 100 to enter quality control mode. Classification system may also enter quality control mode after a user enters a new user coding decision 555.

Quality control mode may attempt to assess the performance of classification system 100 or user 210. For example, quality control mode assesses the performance of the classification system by comparing the scores and classifications calculated by classification process 350 of FIG. 3 with the user coding decisions 555 for the same document. Quality control mode can then determine how closely the classifications calculated by classification system 100 match the user coding decisions 555. A low percentage of correspondence between the two may indicate the need to update the classifiers with additional documents.

Quality control mode may also challenge user 210 by searching for document scores or classifications calculated by classification process 350 that differ from a user coding decision 555. For example, for a two-class classification problem, classification process 350 may have determined that a given document is relevant or otherwise has a high score, while a user 210 previously indicated (or even subsequently indicates) in a user coding decision 555 that the document is non-relevant. In cases where the score for the document calculated by classification process 350 indicates a high probability that the document is in a particular class and the user coding decision 555 provides an indication to the contrary, classification system may require user 210 to re-assess his or her assessment.

Determining a Stopping Criterion/Setting a Threshold

While it would be possible to have user 210 review every document in document collection 120 either during active learning or by repeatedly adding additional documents to an initial document set during training, such a system would have little benefit as it would essentially be the equivalent of a full manual review.

Therefore, it is important to determine (e.g., calculate) a metric that would indicate to user 210 when active learning or training may stop. Calculation of such a metric may include finding one more appropriate threshold values for classes 130 or subclass 140 that allows the classification system 100 to meet a predefined criterion. For example, the one or more thresholds may be set such that classification decisions made by the system will be in agreement with user coding decisions 555 made for one or more control sets of documents. To be effective for its intended purpose, a control set must be selected independently of, and must not be used as part of a training set for a supervised or active learning method. More specifically, user coding decisions 555 for control set documents are not used by classification system 100 in developing the classifiers. However, control set documents are part of document collection 120 and may be regularly processed by classification process 350. To find an appropriate threshold using a control set, a user may submit user coding decisions 555 for each document in the control set. At each iteration of active learning or training, classification system 100 may set a provisional threshold for classification decisions. After setting the provisional threshold, the results of the classification decisions made by classification process 350 are compared with those of the user coding decisions 555 made for the control set documents in order to calculate an agreement percentage. At each iteration, classification system 100 may test one or more provisional thresholds until the agreement percentage for classification decisions made by the classification system and the user coding decisions for the control set documents reaches its maximum for that iteration. If the maximum agreement percentage reaches an acceptable level, classification system 100 may indicate to user that further review is not required for the class or subclass encompassed by the control set. Alternatively, instead of finding a maximum agreement percentage, any threshold meeting the acceptable level may be used.

As an alternative or supplement to using a control set, classification system 100 may estimate for a given threshold the internal recall and precision for the classification effort with respect to each class 130 or subclass 140. At each iteration, classification system 100 may estimate precision and recall at one or more threshold values. When the estimation of precision and/or recall reach a predetermined level (e.g., an acceptable minimum level of $F_1$ for the iteration) classification system 100 may indicate to user 210 that further human review is not required. In certain embodiments, recall for a given threshold may be estimated at each iteration by fitting the scores calculated by classification process 350 for the documents in the class 130 or subclass 140 to a standard distribution. For example, scores may fitted using a maximum likelihood technique to a Gaussian (or other suitable) distribution, and calculating the area beneath the curve to the given threshold, as a fraction of the area under the entire curve. Alternatively, the scores may be fitted to a Gaussian (or other suitable) distribution using a least-squares approach or another suitable technique.

In certain embodiments, classification system 100 may request an estimate of precision. Precision for a given threshold may be estimated by estimating the number of relevant documents above the threshold and dividing by the total number of documents above the threshold. The number of relevant documents above the threshold may be estimated by random sampling (or by exhaustively reviewing the documents to the threshold). The number of relevant documents in the document collection may be estimated by dividing this number by the estimate of recall. In certain embodiments, in order to estimate precision, classification system 100 may select a number of random, previously-unclassified documents that are above a certain threshold. Classification system 100 may then present the selected documents to a user 210 in order to determine how many documents are actually relevant to a class 130 or subclass 140, for example by having user 210 submit a user coding decision for each document. These coding decisions may also be used to further develop classifiers.

In certain embodiments, instead of estimating recall by curve fitting, recall may be estimated by reviewing the set (or a subset) of documents below a threshold, known as the null set. From this review, the number of relevant documents below the threshold can be determined or estimated. In this case, recall is calculated by dividing the number of relevant documents above the threshold (determined by an exhaustive review of the documents above the threshold) by the number of relevant documents above the threshold plus the number of relevant documents below the threshold. When the number of relevant documents above the threshold is determined by exhaustive review, a one-tailed exact binomial test may be applied to establish an upper bound on the number of documents that are missed, and hence a lower bound on recall, to a particular confidence level (typically, 95% confidence). When the documents above the threshold have not been exhaustively reviewed, recall (and a lower bound to a particular confidence level) may be estimated using a simple random sample of all documents (including those above and below the threshold), or using a stratified sample consisting of two strata: a random sample of those documents above the threshold, and a random sample of those documents below the threshold. In certain embodiments, in order to estimate recall, classification system 100 may select a number of random, previously-unclassified documents that are above or below a certain threshold. Classification system 100 may then present the selected documents to a user 210 in order to determine how many documents are actually relevant to a class 130 or subclass 140, for example, by having user 210 submit a user coding decision for each document. These coding decisions may also be used to further develop classifiers.

As a further alternative or supplement, the classification system may request any effectiveness measure. Classification system 100 may request an effectiveness measure similarly to how classification system may request a measure of precision or recall. For example, classification system may select and present selected documents to a user for review. Effectiveness measures may be based on counting the number of true positives (relevant documents classified as relevant), false positives (non-relevant documents classified as relevant), true negatives (non-relevant documents classified as non-relevant), and false negatives (relevant documents classified as non-relevant). Such measures include recall, precision, fallout, F-measure, sensitivity, selectivity, true positive rate, false positive rate, true negative rate, false negative rate, accuracy, error rate, elusion, positive predictive value, negative predictive value, prevalence, richness, and yield. In addition, graphs indicating the tradeoff between recall and precision, such as recall-precision curves, receiver operating characteristic (ROC) curves, and gain curves may be presented to the user, so as to track the effectiveness that has been achieved or could be achieved, for a given amount of review effort. The classification system may also request summary measures for these curves, including area under the ROC curve (AUC) and average precision (AP).

Using a recall-precision curve, ROC curve, or gain curve, it is possible to predict what recall would be achieved, if the threshold were set to include a certain number of documents for review. Using this method, the system may predict how much effort (measured in terms of how many documents must be reviewed) must be expended to achieve a particular level of recall. This information allows the user to make an informed choice as to how much effort is justified to find a particular number of additional relevant documents.

As a further alternative or supplement, when using active learning, classification system 100 may indicate that human review may be terminated by comparing user coding decisions 555 with the scores calculated by a classification process 350. For example, when the highest ranked documents in a priority queue without an associated user coding decision 555 are no longer found to be relevant to a class or subclass by user 210 in a user coding decision 555, the classification system 100 may indicate to the user that further human review is not needed for that class or subclass. More specifically, if an active learning process is selecting highly-ranked (i.e., most likely to be relevant), un-reviewed documents for user review, a certain percentage of consecutive user coding decisions indicating non-relevance may fulfill a stopping criterion. In certain embodiments, a stopping criterion may be fulfilled when a certain percentage of consecutive user coding decisions indicate non-relevance and the number documents actually found to be relevant (e.g., those documents with user coding decisions indicating relevance) meet or exceed an estimate of the number of relevant documents in the collection. For these cases, the set of documents relevant to the class or subclass at issue may be the set of documents identified by the user as relevant to the class or subclass in the received user coding decisions.

When compared with other systems and when compared to manual review, an active learning process based on logistic regression provides a high level of precision and recall, as evidenced by results presented at the TREC 2009 Legal Track (Bruce Hedin et al., *Overview of the TREC 2009 Legal Track*, in NIST SPECIAL PUBLICATION: SP 500-278, THE EIGHTEENTH TEXT RETRIEVAL CONFERENCE (TREC 2009) PROCEEDINGS (2009); Gordon V. Cormack & Mona Mojdeh, *Machine Learning for Information Retrieval: TREC 2009 Web, Relevance Feedback and Legal Tracks*, in NIST SPECIAL PUBLICATION: SP 500-278, THE EIGHTEENTH TEXT RETRIEVAL CONFERENCE (TREC 2009) PROCEEDINGS (2009); Maura R. Grossman & Gordon V. Cormack, *Technology-Assisted Review in E-Discovery Can Be More Effective and More Efficient Than Exhaustive Manual Review*, XVII RICH. J.L. & TECH. 11 (2011)).

Elimination of Seed Sets from Active Learning

Traditional active learning systems typically have several phases. For example, in an initial phase, a subset of documents are selected from the document collection in order to form an initial training set also known as a seed set. Traditionally, the seed set is selected using random sampling, keyword-based searches of the document collection, or ad hoc methods such as comparison with exemplar documents (e.g., documents from or outside of the collection such as synthetic documents). In a second phase, a reviewer evaluates the documents in the seed set and decides whether each document of the seed set is relevant or non-relevant (i.e., whether the document is a member/non-member of a given class). These decisions are used to generate one or more classifiers. In a third phase, in order to refine the classifiers, additional documents from the document collection that were not a part of the seed set are presented to the reviewer. Again, the user decides whether these documents are relevant or non-relevant by coding the documents using some type of interface. Often, this multi-phased approach requires the user to sift through a significant number of documents in order to properly train the classification system. Moreover, selection of seed sets in this manner requires a decision to be made (either by the reviewer or the computerized system) regarding the size and composition of the set. Furthermore, the performance of such phased systems is dependent on the selection of the initial training or seed set.

Figure 11:
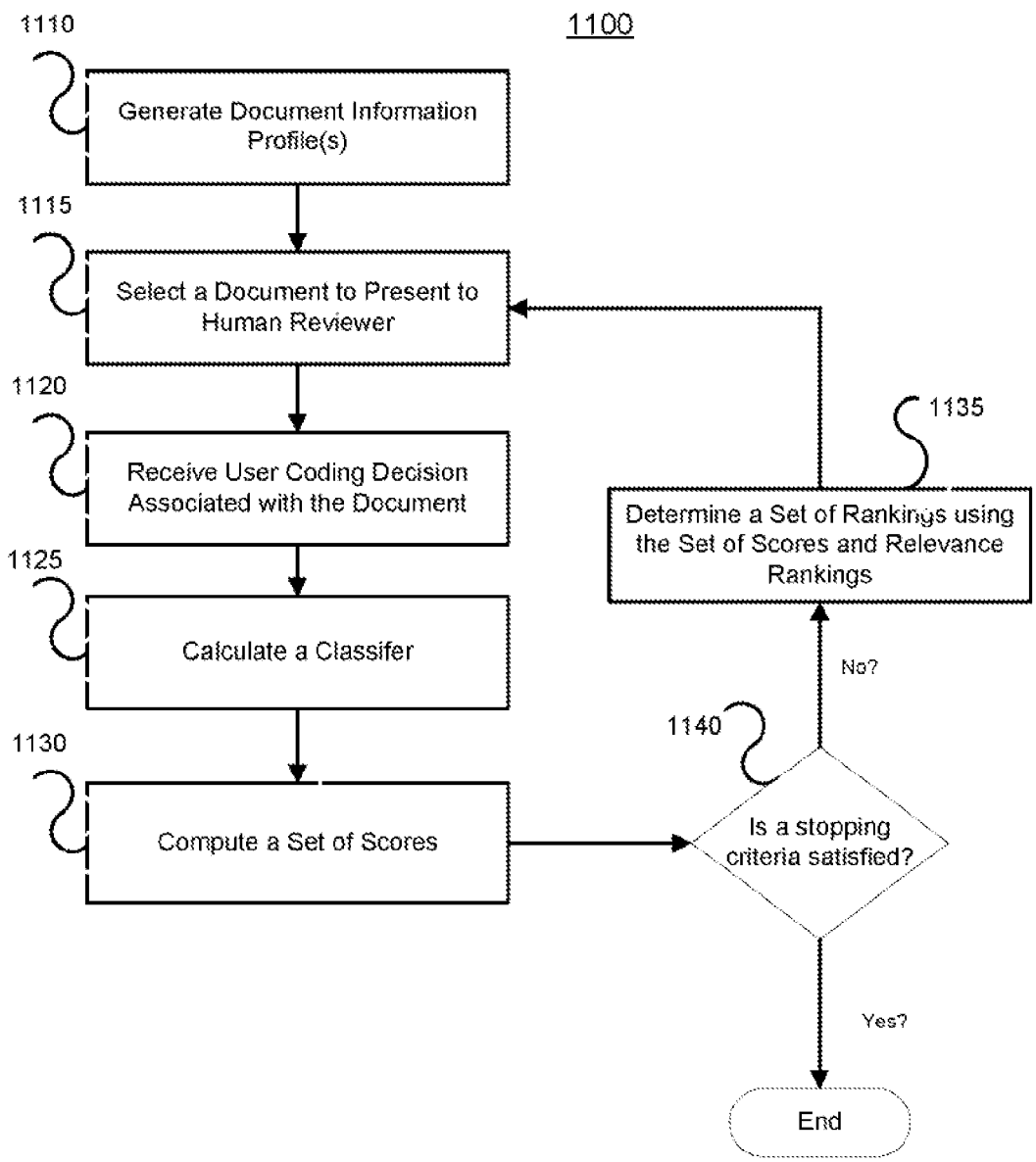
FIG. 11 is a flow diagram illustrating a process for eliminating the use of seed sets in active learning systems or processes according to certain embodiments.

FIG. 11 is an exemplary method 1100 for eliminating the use of seed sets in an active learning system in accordance with certain embodiments. The method combines the aspects of relevance feedback and machine learning to guide the document classification effort. Initially, a document information profile(s) may be generated or received at step 1110. Document information profiles represent the information content of the document and may be generated in accordance with the method 600 of FIG. 6 or another suitable technique.

A document from the document collection may be selected and presented to a reviewer at step 1115. The document may be selected in any suitable manner, for example, randomly, using an ad-hoc searching method, by comparison with an exemplar document such as a synthetic document created to approximate the information content of a likely relevant document or a pre-existing document, whether or not from the collection, that is determined to included relevant information (e.g., a subpoena), or using another suitable technique. For example, the document may be selected according to the technique described above for step 910 of method 900 illustrated in FIG. 9.

Subsequently, a user coding decision may be received for the presented document at step 1120. A classifier may be calculated or updated at step 1125 using the received user coding decision, a previous classifier, and a document information profile for the selected document. The classifier may be calculated in accordance with method 700 of FIG. 7 or using another suitable technique.

After a classifier is calculated or updated, a set of scores may be calculated for a subset of documents of the document collection at step 1130. The subset of documents may be scored in accordance with method 800 of FIG. 8 or using another suitable technique.

At anytime, one or more searching algorithms may derive relevance rankings for the documents of the document collection from user input. For example, a user may use active learning interface 1012 to provide search terms to an algorithm such as BM25 (OKAPI) which will then provide a relevance ranking of the documents according to the user's query. Additionally, relevance rankings may be provided by allowing a user to submit a document exemplar (e.g., a document from or outside of the collection) and comparing that exemplar with the documents of the collection.

Using the calculated set of scores and any provided relevance rankings, a subset of the documents of the collection documents may be ranked or ordered at step 1135. Priority queues or augmented priority queues (both described above) may be used for ordering or ranking the subset of documents. In certain embodiments, a choice may be made to rank the subset of documents using the calculated set of scores, one or more relevance rankings, or using a combined ranking that fuses one or more calculated sets of scores with one or more relevance rankings. In alternative embodiments, more than one ranking is performed and the choice of which ranking to use may be deferred to a subsequent document selection step (e.g., step 1115). Techniques for ranking documents according to scores and for combining score and rank data are described above.

A determination may be made as to whether or not a stopping criterion has been satisfied at step 1140. Whether or not a stopping criterion has been satisfied may be determined in accordance with one of the methods described above or another suitable technique may be used. For example, a stopping criterion may be satisfied when a measure or estimation of precision and recall reach an acceptable level. If a stopping criterion has not been satisfied, a further document may be selected and any of the steps of the method 1100 of FIG. 11 may be repeated until a stopping criterion is satisfied.

Eliminating the use of seed sets in the manner of the method described reduces complexity by avoiding the need to make a decision, either by a user or by the classification system, regarding the size or number of seed sets to use in order to properly train the system. Furthermore, instead of terminating learning at an arbitrary point in the process, learning continues and is refined (e.g., by continually updating classifiers) until substantially all of the relevant documents have been found (thus achieving high recall) or possibly until an objective measure of system performance is realized. Thus, overall classification effectiveness is improved.

One of ordinary skill in the art will appreciate that, aside from providing advantages in e-discovery review, the improved active learning systems, methods and media discussed throughout the disclosure herein may be applicable to a wide variety of fields that require data searching, retrieval, and screening. This is particularly true for applications which require searching for predetermined information or patterns within electronically stored information (regardless of format, language and size), especially as additional documents are added to the collection to be searched. Exemplary areas of potential applicability are law enforcement, security, and surveillance, as well as internet alert or spam filtering, regulatory reporting and fraud detection (whether within internal organizations or for regulatory agencies).

For example, in law enforcement, security, and for surveillance applications, the principles of the invention could be used to uncover new potential threats using already developed classifiers or to apply newly-classified information to discover similar patterns in prior evidence (e.g., crime or counter-terrorism prevention, and detection of suspicious activities). As another example, the principles of the invention could be used for healthcare screening using already developed classifiers or to apply newly-classified information to discover similar patterns in prior evidence (e.g., as predictors for conditions and/or outcomes).

While there have been shown and described various novel features of the invention as applied to particular embodiments thereof, it will be understood that various omissions and substitutions and changes in the form and details of the systems, methods and media described and illustrated, may be made by those skilled in the art without departing from the spirit of the invention. Those skilled in the art will recognize, based on the above disclosure and an understanding therefrom of the teachings of the invention, that the particular hardware and devices that are part of the invention, and the general functionality provided by and incorporated therein, may vary in different embodiments of the invention. Accordingly, the particular system components and results shown in FIG. 1-FIG. 11 are for illustrative purposes to facilitate a full and complete understanding and appreciation of the various aspects and functionality of particular embodiments of the invention as realized in system and method embodiments thereof. Those skilled in the art will appreciate that the invention can be practiced in other than the described embodiments, which are presented for purposes of illustration and not limitation, and the present invention is limited only by the claims which follow.

The invention claimed is:

1. A system for classifying documents in a document collection as relevant or non-relevant in connection with conducting e-discovery in a legal proceeding, the system comprising:
 a memory configured to store the document collection;
 a computing device coupled to the memory, the computing device comprising:
  a display;
  a physical input interface;
  a processor coupled to the display and the input interface, the processor being configured to:
   generate a document information profile for the documents in the collection, each document information profile corresponding to a particular document and representing features and related metadata of that document and no other document;
   select a document from the collection to present to a human reviewer;
   display a portion of the selected document on the display;
   receive, through the input interface, one or more user coding decisions associated with the selected document;
   update a classifier using at least one received user coding decision and the document information profile for the document associated with the at least one received user coding decision, wherein the classifier is updated using an incremental learning technique;

compute a set of scores for the documents in the collection by applying the updated classifier to the document information profile associated with each document to be scored;

estimate a number of relevant documents in the document collection by (i) fitting scores computed for documents for which user coding decisions were received to a standard distribution curve, and (ii) calculating an area beneath the curve in order to determine whether review is complete by comparing the estimate to a number of documents in the document collection that the user coded as relevant and that were used to update the classifier;

indicate on the display statistics pertaining to the extent to which review is complete;

in response to determining that review is not complete, repeat the steps of selecting a document, displaying a portion of the selected document, receiving one or more user coding decisions associated with the selected document, updating a classifier, computing a set of scores, and estimating a number of relevant documents; and classify documents in the document collection as relevant or non-relevant to the legal proceeding using the computed scores or the received user coding decisions.

2. The system of claim 1, wherein the selected document is one whose score is not within a range of scores associated with a previously selected document.

3. The system of claim 1, wherein the processor is further configured to receive or provide relevance rankings, wherein the relevance rankings are generated by one or more keyword searching algorithms or by a comparison with one or more exemplary documents.

4. The system of claim 3, wherein the relevance rankings are generated using more than one technique.

5. The system of claim 4, wherein an output of the relevance rankings techniques are combined using reciprocal rank fusion.

6. The system of claim 4, wherein an output of the relevance rankings techniques are combined using stacking.

7. The system of claim 1, wherein the processor is further configured to manage priority queues for ranking the one or more documents of the document collection.

8. The system of claim 7, wherein the selected document is one whose score or priority queue ranking is not within a range of scores or rankings associated with a previously selected document.

9. The system of claim 7, wherein the processor is further configured to receive or provide relevance rankings, wherein the relevance rankings are generated by one or more keyword searching algorithms or by a comparison with one or more exemplary documents.

10. The system of claim 9, wherein the ranking of the priority queues is derived from a subset of the set of scores and the relevance rankings.

11. The system of claim 1, wherein the selected document is identified as not being similar to a previously selected document using unsupervised learning techniques.

12. The system of claim 1, wherein the processor is further configured to pre-process documents from the document collection to reduce dimensionalities of document information profiles.

13. The system of claim 12, wherein pre-processing the documents includes converting characters of the document to a common case or compressing strings of non-alphanumeric characters to a single character.

14. The system of claim 1, wherein selecting the document comprises choosing among a set of techniques for selecting the document.

15. The system of claim 14, wherein the choosing among the set of techniques is prioritized using move-to-front pooling.

16. The system of claim 1, wherein the standard distribution is a Gaussian distribution.

17. The system of claim 1, wherein the document information profile of the document to be scored is generated using an N-gram technique.

18. The system of claim 1, wherein the document information profile of the document to be scored is generated from at least a portion of the contents of that particular document and related metadata.

19. The system of claim 1, wherein the document information profile of the document to be scored is generated from multiple overlapping portions of the contents of that particular document and related metadata.

20. The system of claim 1, wherein the incremental learning technique is a gradient ascent or descent technique.

* * * * *